(12) United States Patent
Yu

(10) Patent No.: US 12,365,246 B2
(45) Date of Patent: Jul. 22, 2025

(54) DRIVING CONTROL METHOD OF VEHICLE DISPLAY

(71) Applicant: HYUNDAI MOBIS CO., LTD., Seoul (KR)

(72) Inventor: Byung Mo Yu, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 275 days.

(21) Appl. No.: 18/069,335

(22) Filed: Dec. 21, 2022

(65) Prior Publication Data

US 2023/0347738 A1    Nov. 2, 2023

(30) Foreign Application Priority Data

Apr. 28, 2022  (KR) .................. 10-2022-0053007
Apr. 28, 2022  (KR) .................. 10-2022-0053008

(51) Int. Cl.
| | |
|---|---|
| *B60K 35/00* | (2024.01) |
| *B60K 35/22* | (2024.01) |
| *B60K 35/53* | (2024.01) |
| *B60K 35/81* | (2024.01) |
| *B60K 35/90* | (2024.01) |
| *B60K 35/28* | (2024.01) |

(52) U.S. Cl.
CPC .............. *B60K 35/00* (2013.01); *B60K 35/22* (2024.01); *B60K 35/28* (2024.01); *B60K 35/53* (2024.01); *B60K 35/81* (2024.01); *B60K 35/90* (2024.01); *B60K 2360/175* (2024.01); *B60K 2360/178* (2024.01)

(58) Field of Classification Search
CPC ........ B60K 35/00; B60K 35/22; B60K 35/28; B60K 35/53; B60K 35/81; B60K 35/90; B60K 2360/175; B60K 2360/178; B60K 35/223; B60K 35/231; B60K 35/55; B60R 2300/20
See application file for complete search history.

(56) References Cited

U.S. PATENT DOCUMENTS

| | | | | |
|---|---|---|---|---|
| 6,820,736 B2 * | 11/2004 | Itoh | .................. | B65G 47/31 198/781.01 |
| 2003/0125873 A1 * | 7/2003 | Yamaguchi | ............ | B60K 35/00 345/204 |

(Continued)

FOREIGN PATENT DOCUMENTS

| | | | | | |
|---|---|---|---|---|---|
| JP | H056429 U | * | 7/1991 | .......... | G02F 1/1333 |
| JP | 2019-136869 A | | 8/2019 | | |

(Continued)

*Primary Examiner* — Abby Y Lin
*Assistant Examiner* — Esvinder Singh
(74) *Attorney, Agent, or Firm* — Novo TechIP International PLLC

(57) ABSTRACT

Provided is a driving control method, of a display of a vehicle, including receiving an input signal selected for one of an open mode and a closed mode of the display of the vehicle, operating a drive motor of the display to move the display to a preset target position according to the input signal for each of the modes, and stopping the drive motor after the display reaches the preset target position, wherein the driving control method further includes detecting external resistance by measuring a current value of the drive motor between the operating of the drive motor and the stopping of the drive motor.

11 Claims, 24 Drawing Sheets

(56) References Cited

U.S. PATENT DOCUMENTS

| | | | |
|---|---|---|---|
| 2006/0164230 A1* | 7/2006 | DeWind | B60K 35/00 |
| | | | 340/461 |
| 2012/0262868 A1* | 10/2012 | Kato | H04N 5/655 |
| | | | 361/679.21 |
| 2016/0226411 A1* | 8/2016 | Noda | B64D 11/00 |
| 2020/0070736 A1* | 3/2020 | Kim | B60K 35/00 |
| 2022/0118933 A1* | 4/2022 | Jaradi | B60R 21/017 |
| 2022/0147179 A1* | 5/2022 | Kim | G06F 3/041 |
| 2022/0240480 A1* | 8/2022 | Noh | A01K 1/0114 |
| 2022/0317767 A1* | 10/2022 | Zhang | F16M 13/02 |

FOREIGN PATENT DOCUMENTS

| | | |
|---|---|---|
| KR | 2007-0078471 A | 8/2007 |
| KR | 2020-0002711 A1 | 1/2020 |
| KR | 2021-0006974 A | 1/2021 |

* cited by examiner

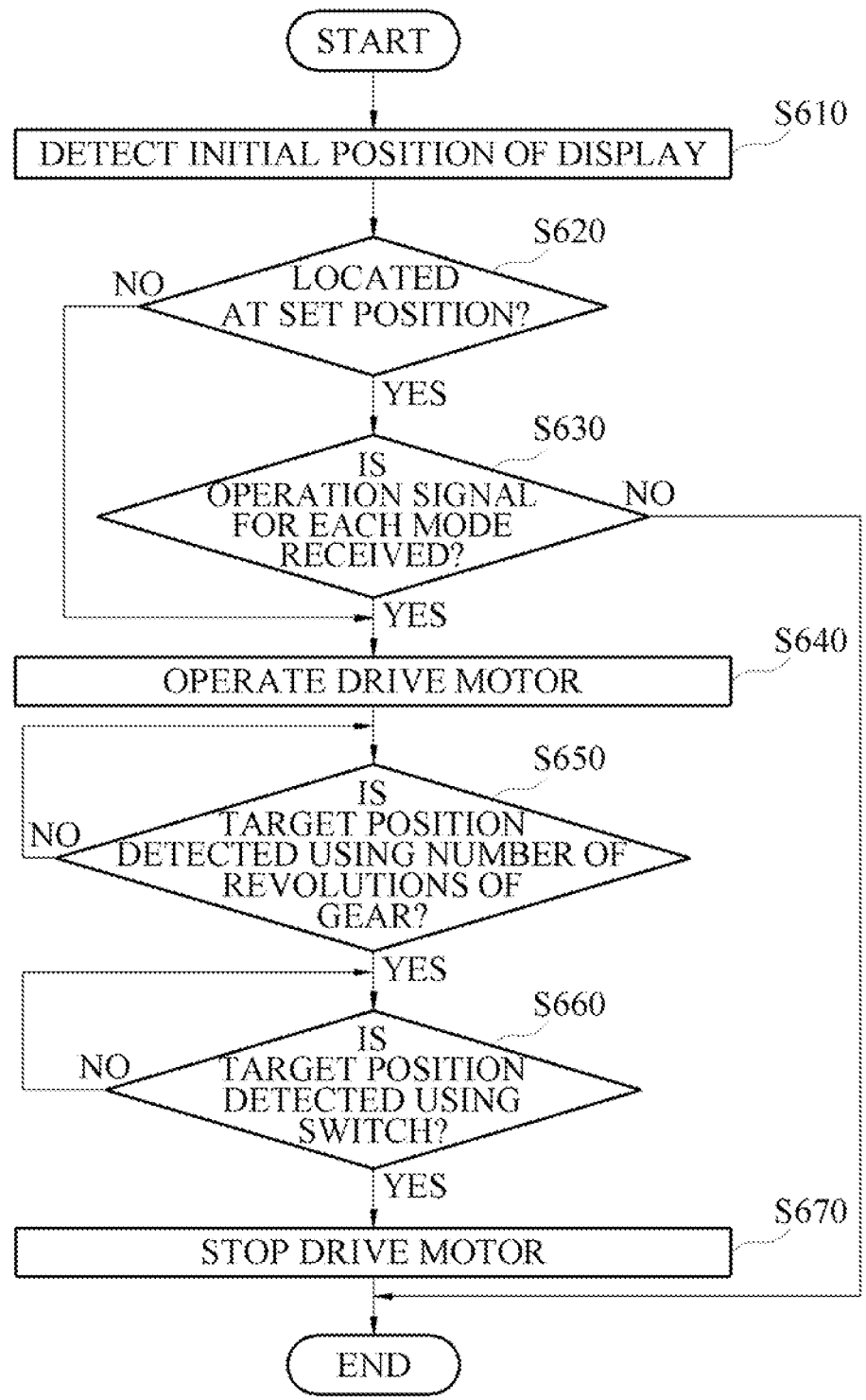

DRIVING CONTROL METHOD OF VEHICLE DISPLAY

CROSS-REFERENCE TO RELATED APPLICATIONS

This application claims priority to and the benefit of Korean Patent Application No. 10-2022-0053007, filed on Apr. 28, 2022, and Korean Patent Application No. 10-2022-0053008, filed on Apr. 28, 2022, the disclosure of which are incorporated herein by reference in its entirety.

TECHNICAL FIELD

The present disclosure relates to a driving control method of a display of a vehicle.

BACKGROUND

A display of a vehicle provides content according to driving conditions.

Recently, with the advancement of autonomous driving technology, infotainment functions in a vehicle are being actively developed and thus a large-scale display should be driven in a separate manner to secure a field of view.

Thus, a method of selectively exposing a display may be applied, but when this method is applied, a device is likely to be broken or malfunction when an external force is applied to a display, e.g., when the display is forcibly pressed, during operation of the display.

In addition, when a user's hand is caught in a gap that forms a path along which the display moves, the user may be injured and thus there is a need for additional measures.

SUMMARY

To address the above-described problems, the present disclosure is directed to providing a driving control method of a display of a vehicle for driving and controlling a display of a vehicle according to a current value and/or an operating time with respect to external resistance (external force).

Aspects of the present disclosure are not limited thereto and other aspects that are not mentioned herein will be apparent to those of ordinary skill in the art from the following descriptions.

According to an aspect of the present disclosure, a driving control method of a display of a vehicle includes receiving an input signal selected for an open mode or a closed mode of the display of the vehicle, operating a drive motor of the display to move the display to a preset target position according to the input signal for each of the modes, and stopping the drive motor after the display reaches the preset target position, wherein the driving control method further includes detecting external resistance by measuring a current value of the drive motor between the operating of the drive motor and the stopping of the drive motor.

The detecting of the external resistance includes detecting whether the current value of the drive motor is abnormal by comparing a measured current value of the drive motor with a preset reference current value, and determining that external resistance is generated and urgently stopping the drive motor, when the measured current value of the drive motor is greater than the preset reference current value.

The operating of the drive motor may further include a reset operation of operating the drive motor, which is urgently stopped in the detecting of the external resistance, to receive a preset initial position input signal of the display and move the display to an initial position.

In the reset operation, the preset initial position may be a start position in the open mode or the closed mode.

The urgently stopping of the drive motor may include urgently stopping the drive motor for a preset time and transmitting a warning notification message in the form of a screen and/or voice to a passenger in the vehicle of a current situation, and transmitting the warning notification message to a server to store the warning notification message in the server.

The stopping of the drive motor may include detecting a target position in each of the modes by detecting a target position of the display through an open switch or a close switch located at an end point in each of the modes, and stopping the drive motor after detecting the target position of the display through the open switch or the close switch.

According to another aspect of the present disclosure, a driving control method of a display of a vehicle includes receiving an input signal selected for an open mode or a closed mode of the display of the vehicle, operating a drive motor of the display to move the display to a preset target position according to the input signal for each of the modes, and stopping the drive motor after the display reaches the preset target position, wherein the driving control method further includes detecting external resistance by measuring the number of revolutions of a gear of the drive motor between the operating of the drive motor and the stopping of the drive motor.

According to another aspect of the present disclosure, a driving control method of a display of a vehicle includes receiving an input signal selected for one of an open mode and a closed mode of the display of the vehicle, operating a drive motor of the display to move the display to a preset target position according to the input signal for each of the modes, and stopping the drive motor after the display reaches the preset target position, wherein the driving control method further includes detecting external resistance by measuring a current value of the drive motor and/or the number of revolutions of a gear of the drive motor between the operating of the drive motor and the stopping of the drive motor.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 22 to 24 are detailed flowcharts of position control methods of a display of a vehicle according to other modified embodiments of the present disclosure.

DETAILED DESCRIPTION

Figure 1:
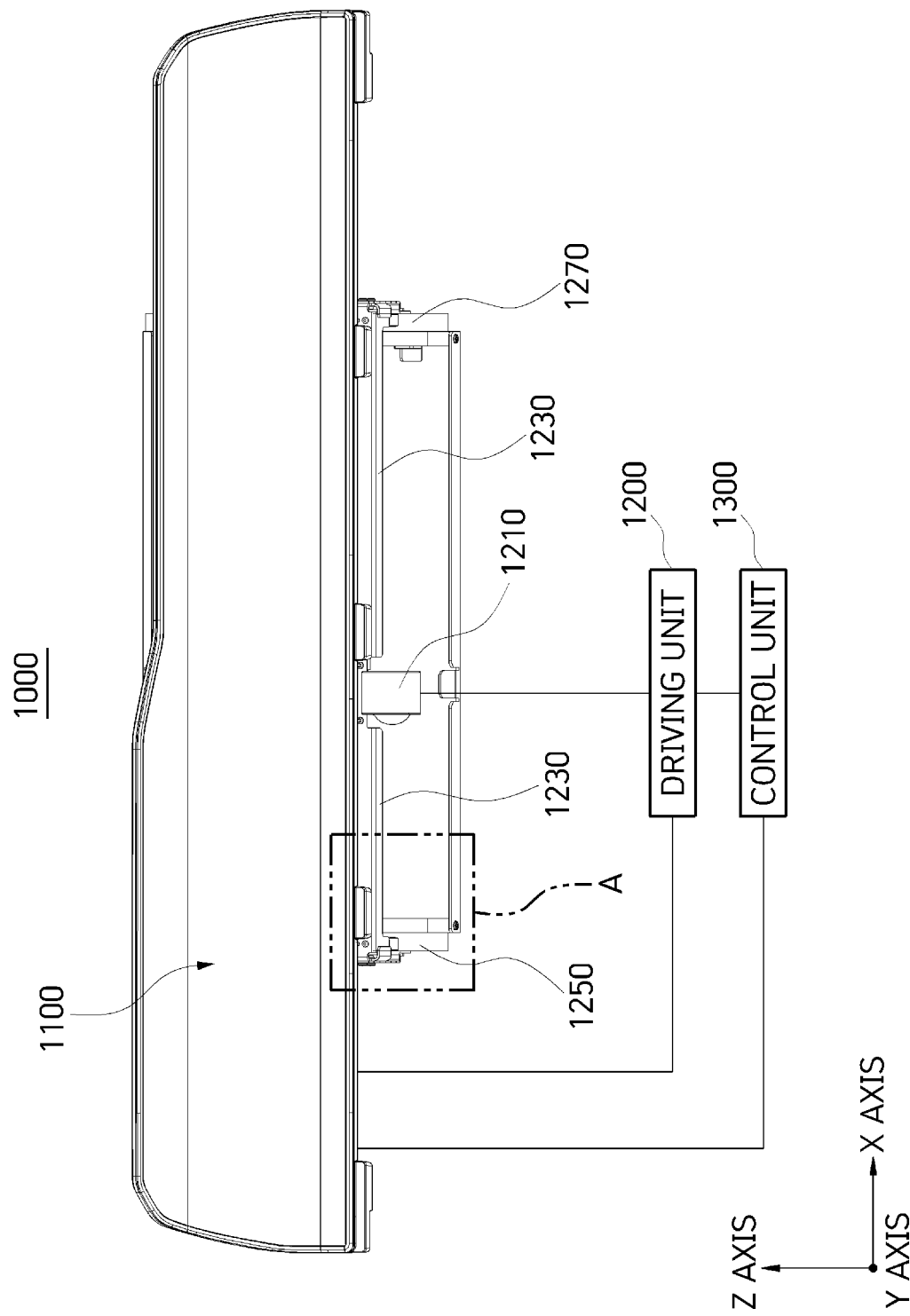
FIG. 1 is a front view schematically illustrating a display apparatus for a vehicle according to a first embodiment of the present disclosure.

Advantages and features of the present disclosure and methods of achieving them will be apparent from embodiments described in detail, in conjunction with the accompanying drawings. However, the present disclosure is not limited to the embodiments set forth herein and may be embodied in many different forms. Rather, these embodiments are provided so that this disclosure will be thorough and complete and will fully convey the concept of the present disclosure to those of ordinary skill in the art, and the scope of the present disclosure should be defined by the claims. The terminology used herein is for the purpose of describing embodiments only and is not intended to be limiting of the present disclosure. As used herein, singular forms are intended to include plural forms unless the context clearly indicates otherwise. As used herein, the term "comprise" or "comprising" specifies the presence of stated components, steps, operations and/or elements but does not preclude the presence or addition of one or more other components, steps, operations and/or elements. As used herein, the term "and/or" includes any and all combinations of one or more of the listed items.

Hereinafter, embodiments of the present disclosure will be described in detail with reference to the accompanying drawings.

Coordinate System Display

In the drawings of the present disclosure, X, Y, and Z axes represent a three-dimensional (3D) orthogonal coordinate system that displays the coordinates of a point or vector with respect to linear coordinate axes crossing each other vertically. For convenience of description, in the 3D orthogonal coordinate system, the X axis may be described as an axis facing a side of a vehicle in a width direction, the Y axis may be described as an axis facing a side of the vehicle in a longitudinal direction, and the Z axis may be described as an axis facing the top and bottom (ceiling and bottom) of the vehicle.

Each of an X-axis direction, a Y-direction and a Z-axis direction includes a positive direction and a negative direction.

A positive X-axis direction is a direction toward a lateral right side, and a negative X-axis direction is a direction toward a lateral left side.

A positive Y-axis direction is a direction toward the front of a vehicle in a longitudinal direction, and a negative Y-axis direction is a direction toward the rear of the vehicle in the longitudinal direction.

A positive Z-axis direction is a direction toward the ceiling of the vehicle, and a negative Z-axis direction is a direction toward the bottom of the vehicle.

For convenience of description, the positive and negative directions of each of the axes may be described on the basis of the same reference point or different reference points.

For example, in the present disclosure, the positive X-axis direction and the negative X-axis direction are a direction toward a lateral right side and a direction toward a lateral left side, respectively, but the directions may be determined with respect to a reference point that may vary according to a system.

First Embodiment (Basic Configuration)

FIG. 1 is a front view schematically illustrating a display apparatus for a vehicle according to a first embodiment of the present disclosure.

Referring to FIG. 1, a display apparatus 1000 for a vehicle according to the first embodiment of the present disclosure includes a screen unit 1100, a driving unit 1200, and a control unit 1300.

The screen unit 1100 outputs vehicle operation information and an image of each function. The screen unit 1100 is a large screen display, the basic size and performance of which exceed those of an existing display (not shown) that provides only vehicle operation information.

That is, when an autonomous mode that has come into widespread use owing to the development of technology is used, the screen unit 1100 may provide an occupant with more comfortable and convenient information (e.g., infotainment information, etc.) in the form of an image.

However, when an occupant does not use autonomous driving but has to drive a vehicle by himself or herself, a large screen of the screen unit 1100 may obstruct the occupant's field of view, thus causing a risk of a safety accident.

Therefore, the screen unit 1100 of the present disclosure may provide the convenience of a large screen in an autonomous driving mode (open mode), and control a degree of exposure of a screen to secure a driver's field of view in a driving mode (closed mode).

Therefore, the position of the screen unit 1100 is adjusted by the driving unit 1200 to selectively control a range of exposure of the display area, and a predetermined image may be output according to the range of exposure of the display area.

The driving unit 1200 adjusts a position of the screen unit 1100 through a rotary pop-up.

The control unit 1300 may control driving of the driving unit 1200 through a predetermined command or manipulation of a switch. The control unit 1300 may have a control logic limited to a corresponding function or may be an electronic control unit (ECU) of a vehicle.

First Embodiment (Operation Mechanism)

FIGS. 2 to 11 illustrate components of the display apparatus for a vehicle according to the first embodiment of the present disclosure and a relationship between operations of the components.

Figure 2:
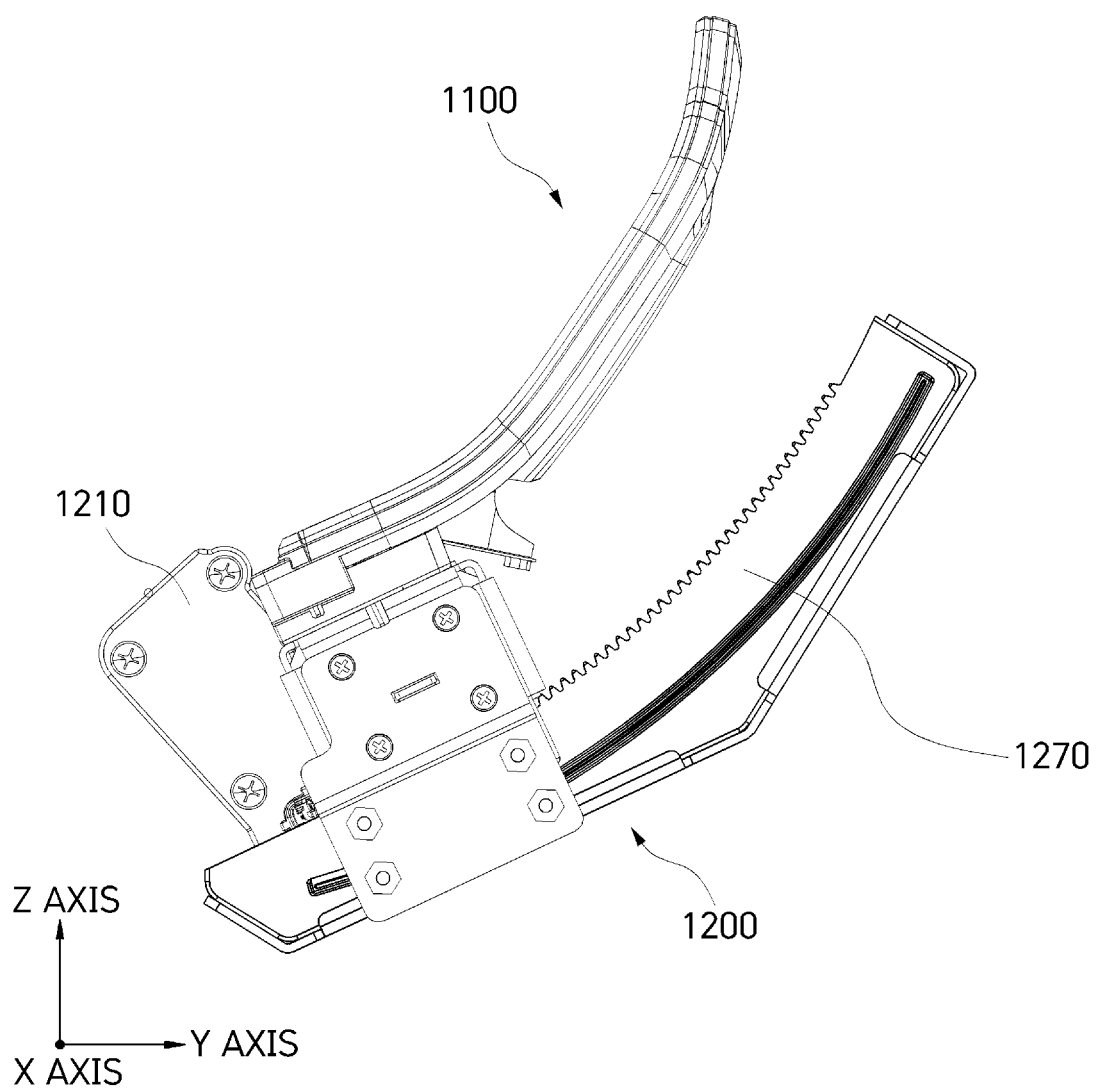
FIGS. 2 and 3 are side views schematically illustrating an operation mechanism of the display apparatus for a vehicle according to the first embodiment of the present disclosure.
Figure 3:
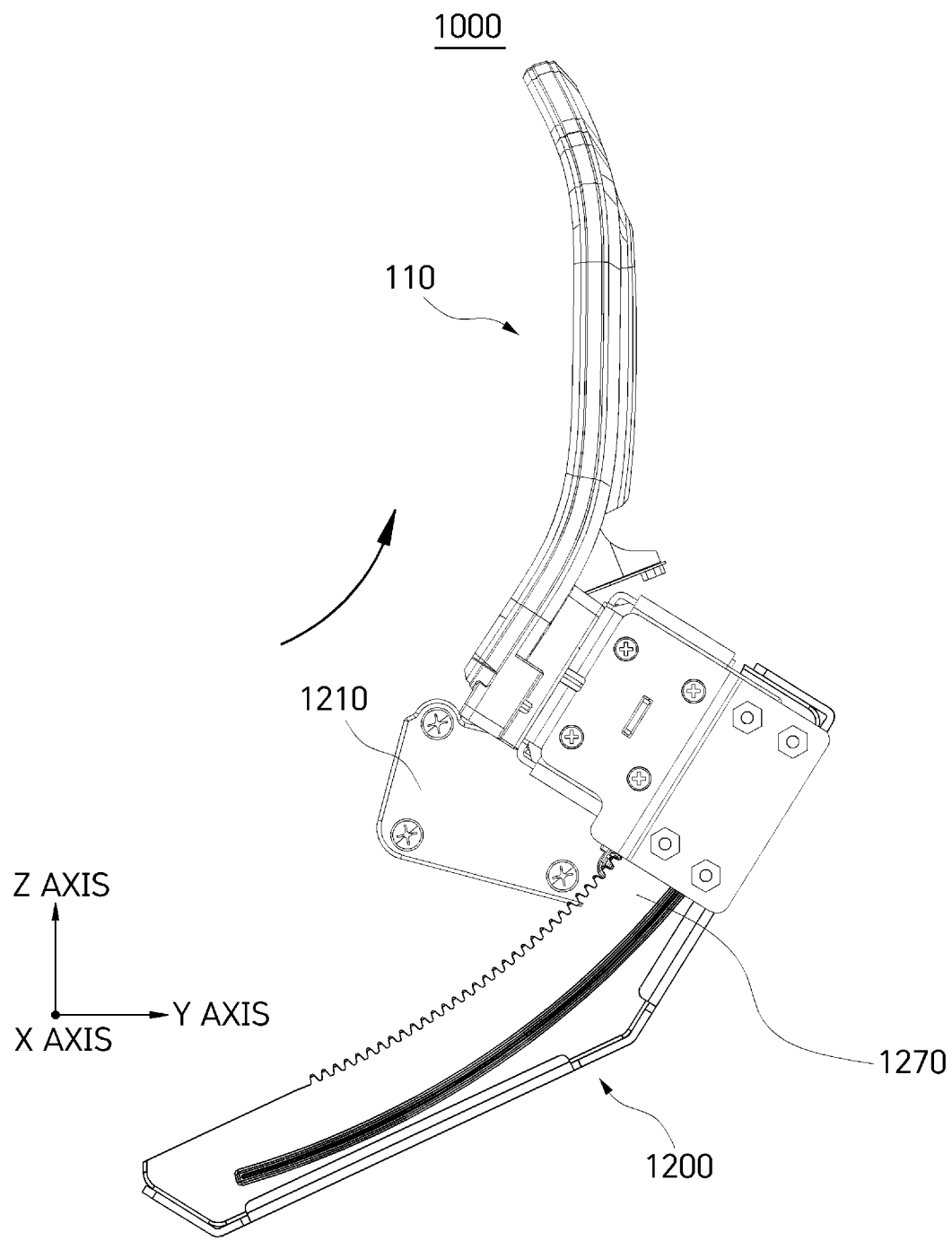

Referring to FIGS. 2 and 3, a position of the screen unit 1100 above a second rack gear 1270 may be adjusted by the driving unit 1200. Here, the screen unit 1100 may enter an open mode when the screen unit 1100 is moved in the positive Y-axis direction between a first rack gear 1250 of FIG. 1 and the second rack gear 1270 of FIGS. 2 and 3.

Conversely, the screen unit 1100 may enter a closed mode when the screen unit 1100 is moved in the negative Y-axis direction between the first rack gear 1250 of FIG. 1 and the second rack gear 1270 of FIGS. 2 and 3.

Figure 4:
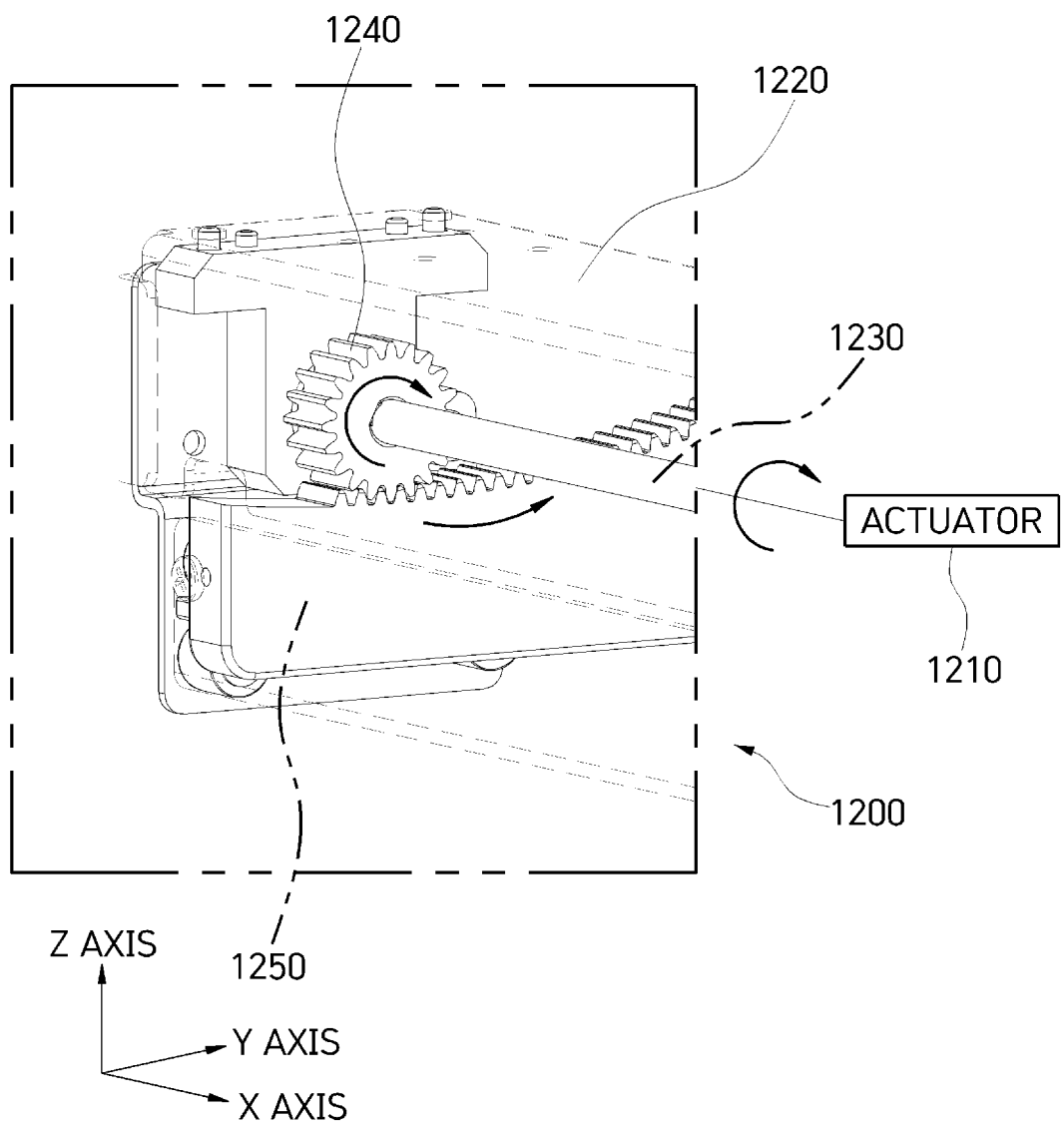
FIG. 4 is an enlarged view of a portion A of FIG. 1 for describing a relationship between operations of components.

Referring to FIG. 4, as a basic function, the driving unit 1200 transmits a driving force to a rotation shaft 1230 through an actuator 1210 to cause a first pinion gear 1240, which is connected to one end of the rotation shaft 1230, to be engaged with the first rack gear 1250 while rotating in connection with the rotation shaft 1230.

Therefore, the rotation shaft 1230 rotates in a direction in which the driving force is transmitted from the actuator 1210, thus causing the first pinion gear 1240, which rotates in connection with the rotation shaft 120, to move while engaged with the first rack gear 1250.

When the first pinion gear 1240 rotates in the positive Y-axis direction, a cover 1220 connected to the screen unit 1100 of FIGS. 1 to 3 is moved in the positive Y-axis direction along a path of the first rack gear 1250.

Figure 5:
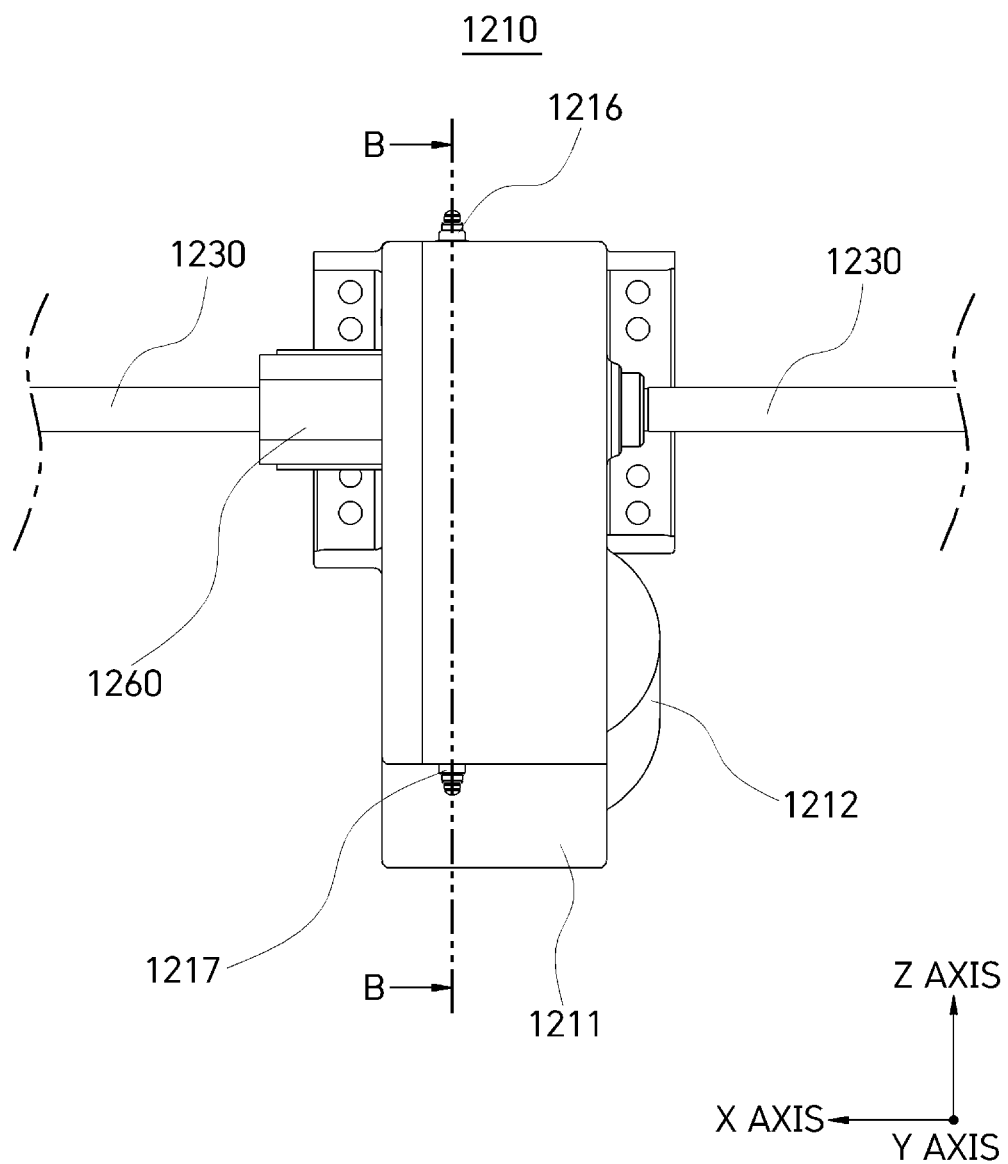
FIG. 5 is a schematic view of an actuator of the display apparatus for a vehicle according to the first embodiment of the present disclosure.
Figure 6:
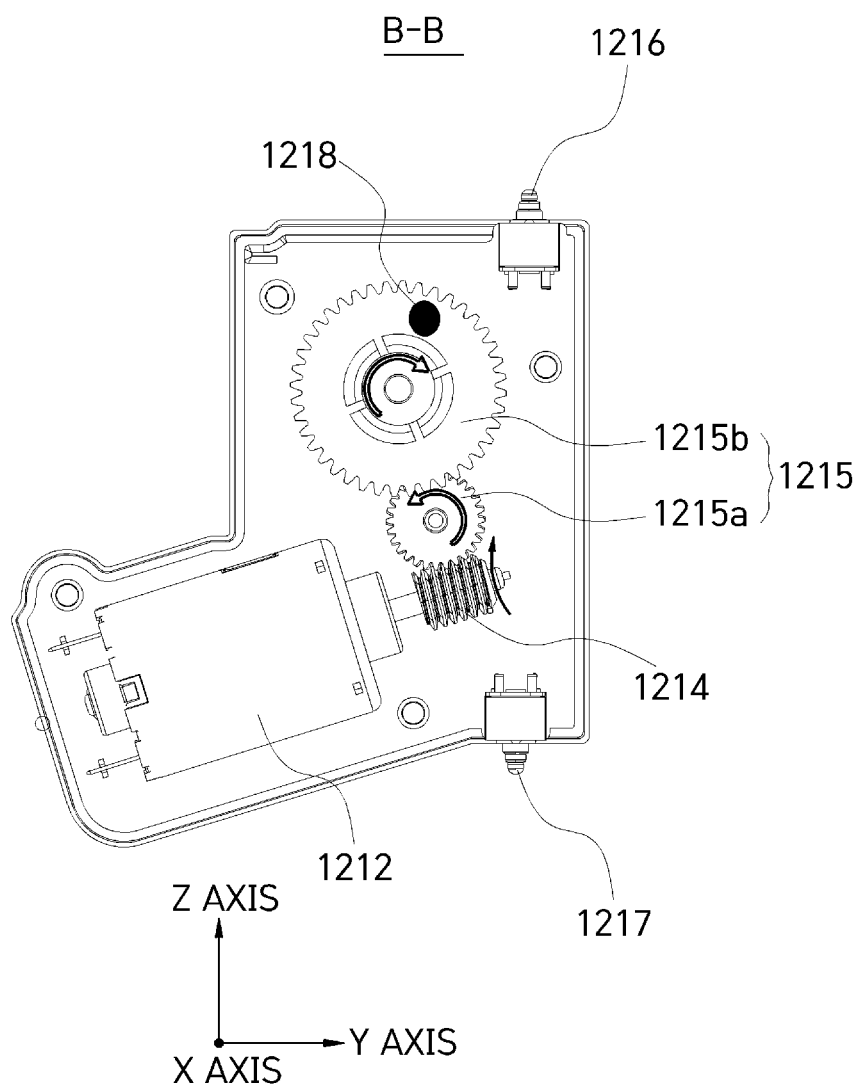
FIG. 6 is a cross-sectional view taken along line B-B of FIG. 5.

Referring to FIGS. 5 and 6, the actuator 1210 includes a housing 1211, a driving motor 1212, a helical gear 1214, a spur gear 1215, an opening switch 1216, and a closing switch 1217.

The housing 1211 is located above the rotation shaft 1230 while connected to a rear surface of the screen unit 1100.

The driving motor 1212 is located in the housing 1211 and has a drive shaft 1213.

The helical gear 1214 is connected to the drive shaft 1213 to rotate in connection with the drive shaft 1213.

The spur gear 1215 includes a first sawtooth 1215a that rotates in connection with the helical gear 1214, and a second sawtooth 1215b that rotates in connection with the first sawtooth 1215a and that is connected to the rotation shaft 1230.

The opening switch 1216 is located on an upper end of the housing 1211 and detects an open position of the screen unit 1100.

The closing switch 1217 is located on a lower end of the housing 1211 and detects a closed position of the screen unit 1100.

The actuator 1210 may detect a current position of the screen unit 1100 through a magnet 1218 connected to the second sawtooth 1215b and a magnet sensor 1219 that is located in a region of the housing 1211 and that detects the number of rotations of the magnet 1218.

Figure 7:
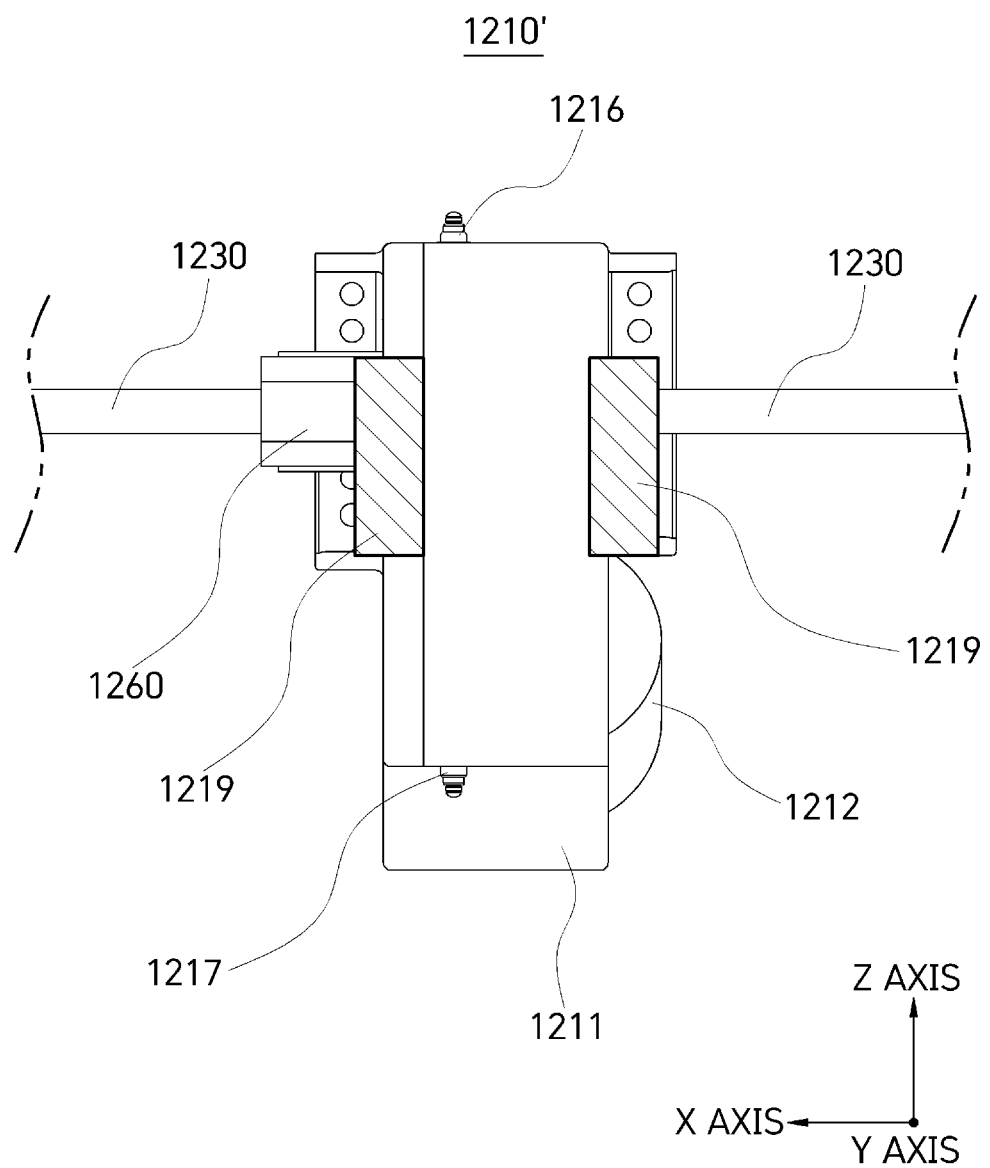
FIG. 7 is a schematic view of a modified example of the actuator of the display apparatus for a vehicle according to the first embodiment of the present disclosure.

As another example, as shown in FIG. 7, an actuator 1210' may include an opening switch 1216, a closing switch 1217, a magnet 1218, and a magnet sensor 1219 to induce stable driving.

When resetting is activated by a user through a separate switch (not shown) and/or a predetermined command, the driving unit 1200 moves the screen unit 1100 in a direction of a closed mode or an open mode.

Accordingly, the opening switch 1216, the closing switch 1217, the magnet 1218, and the magnet sensor 1219 may detect a current reset position of the screen unit 1100.

Figure 8:
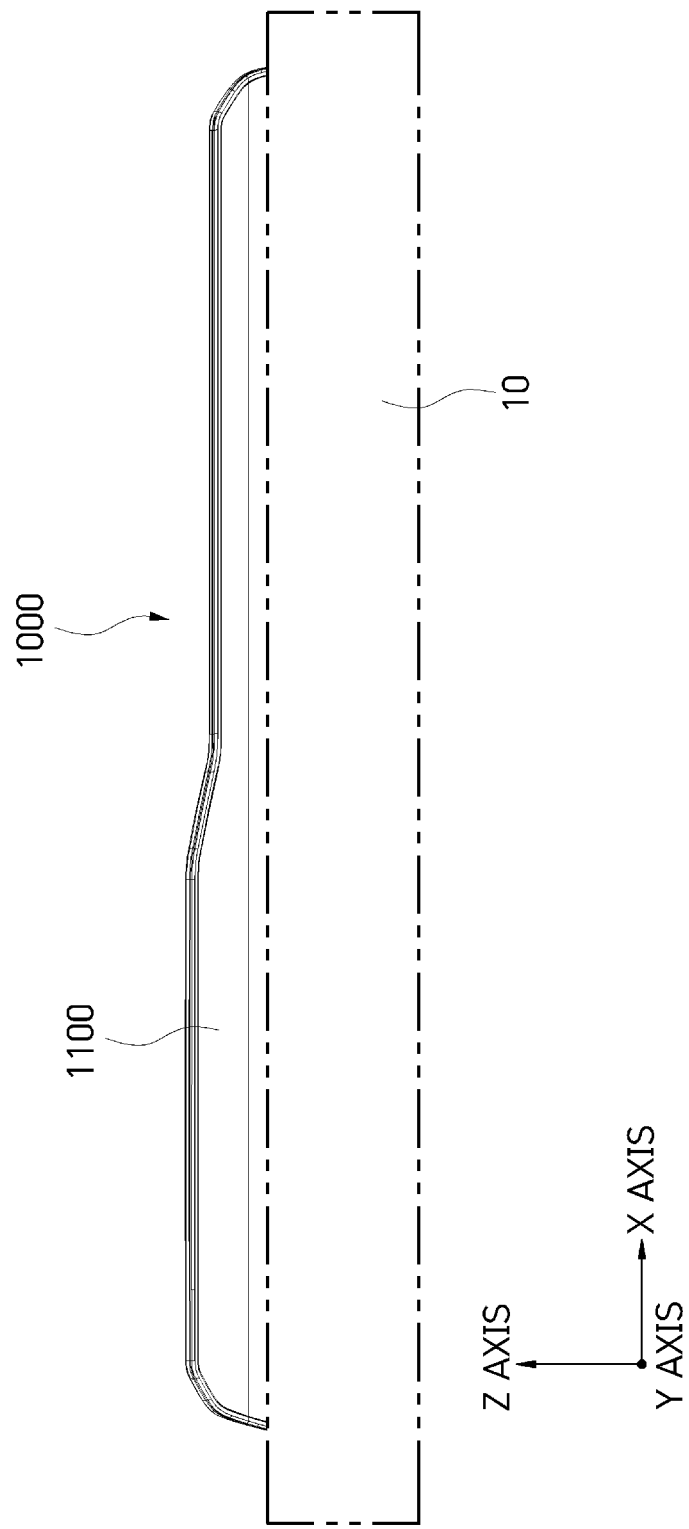
FIGS. 8 and 9 illustrate examples in which a screen unit of the display apparatus for a vehicle according to the first embodiment of the present disclosure is selectively exposed.

In FIG. 8, the screen unit 1100 is in the closed mode and thus outputs images of only relatively simple information relating to a vehicle speed, an operation direction, and sound sources.

Figure 9:
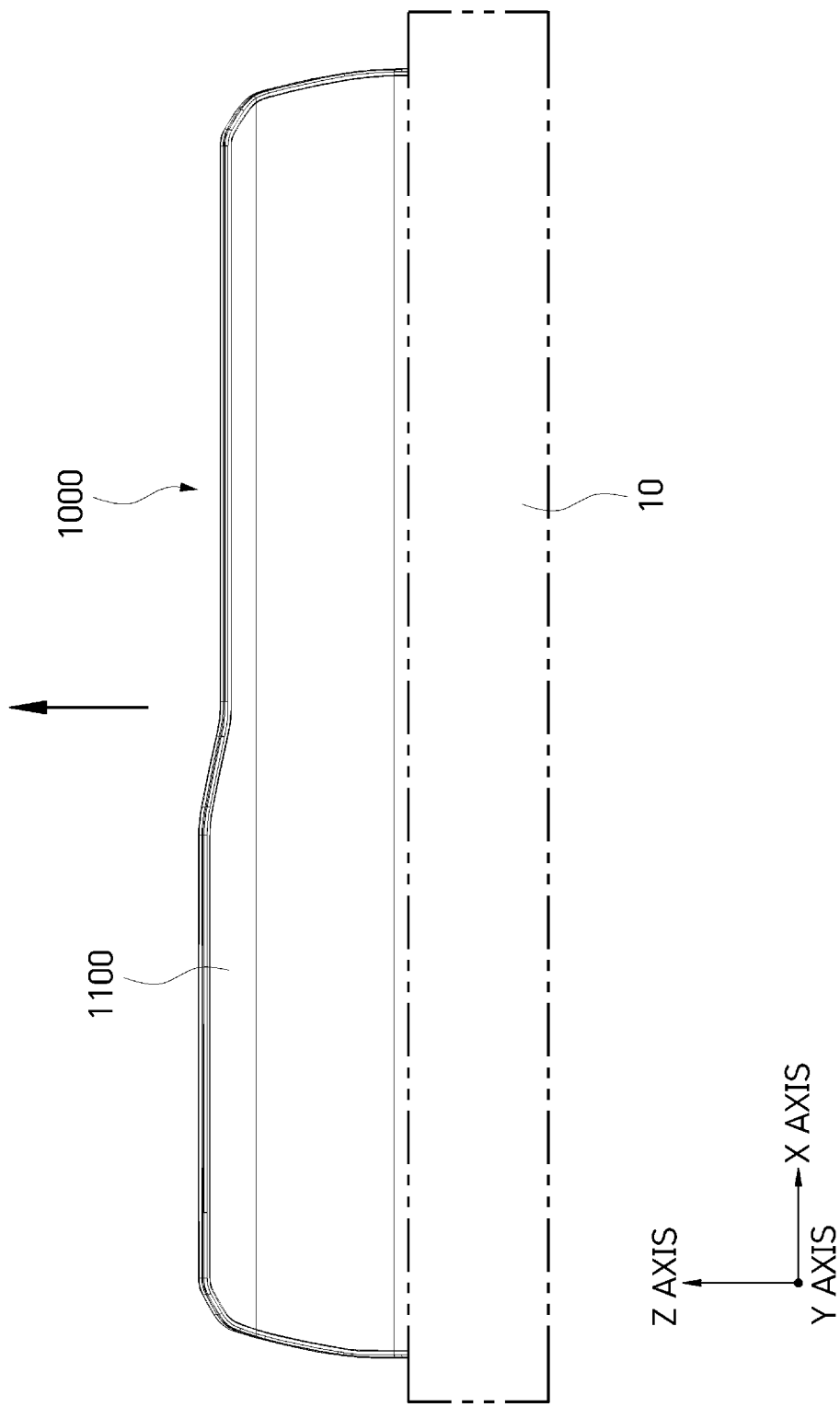

On the other hand, in FIG. 9, the screen unit 1100 is in the open mode and thus outputs an image of a combination of vehicle operation information and entertainment information through a plurality of graphical user interfaces (GUIs).

Figure 10:
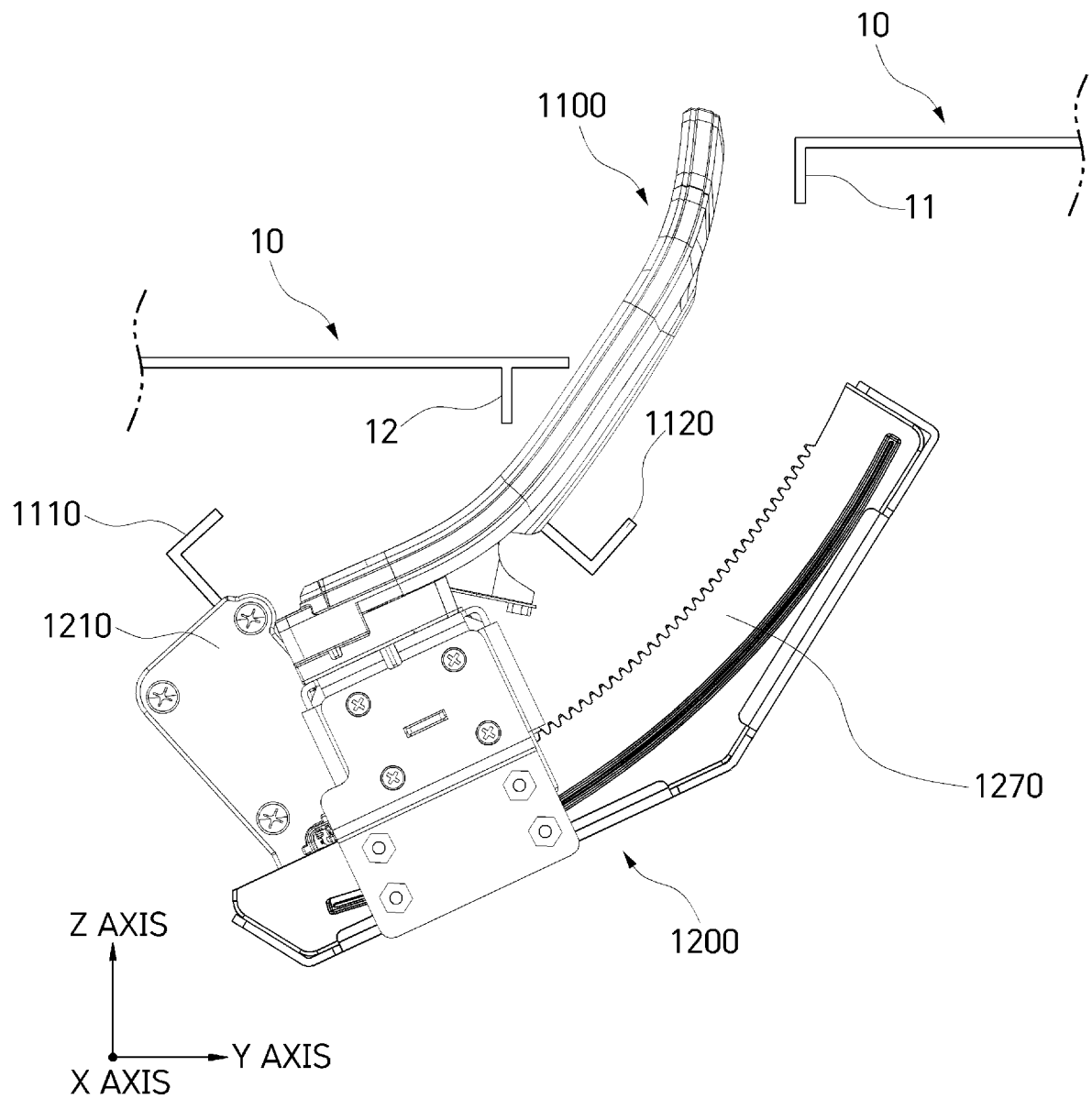
FIGS. 10 and 11 are side views schematically illustrating an operation mechanism of a display apparatus for a vehicle according to a modified example of the first embodiment of the present disclosure.
Figure 11:
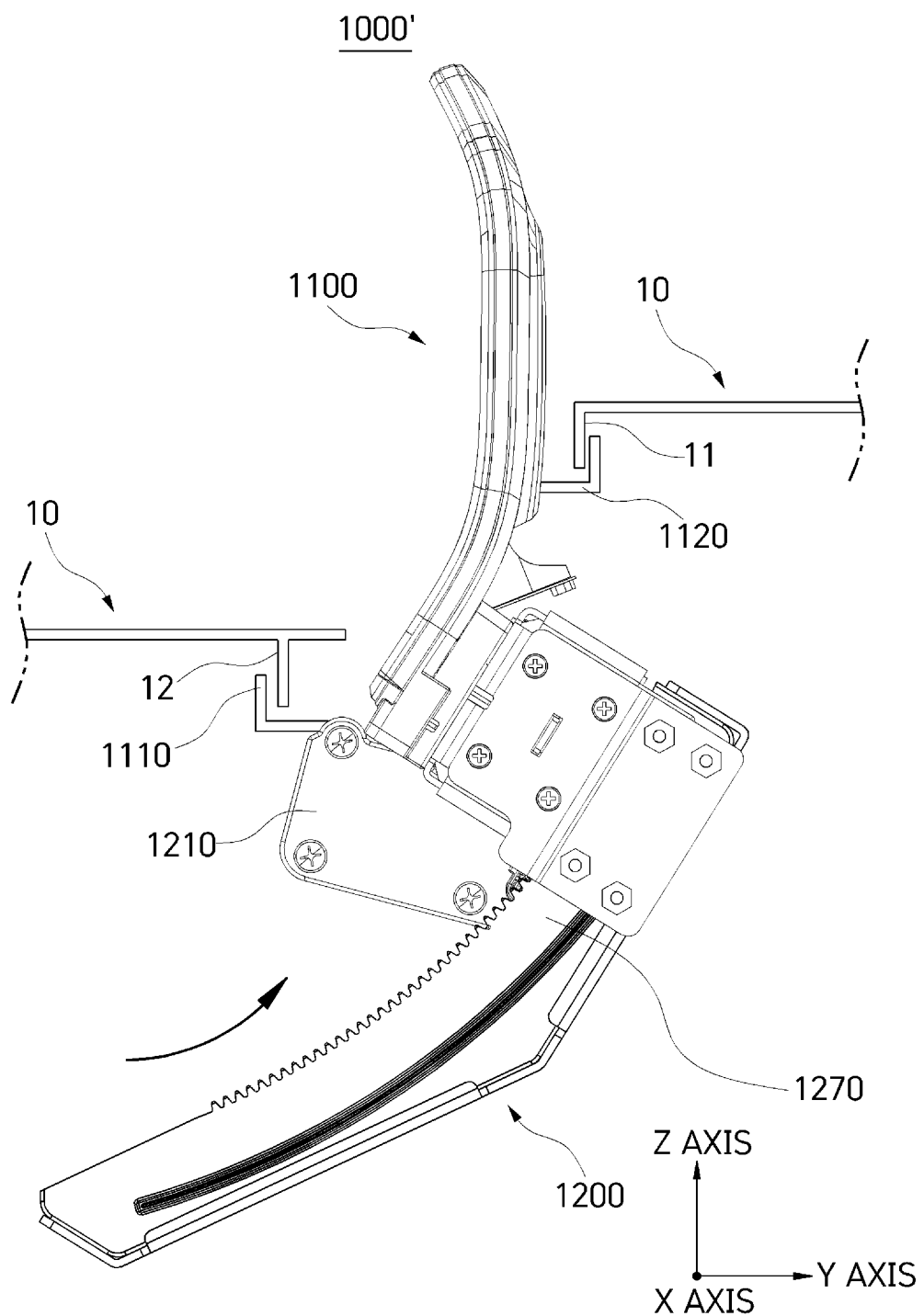

In FIGS. 10 and 11, a display apparatus 1000' for a vehicle includes a first hook 1110 and a second hook 1120 to ensure rigidity.

The first hook 1110 and the second hook 1120 may be respectively provided at a front side and rear side of the screen unit 1100 and be snap-fit-fastened with a cockpit module 10 when the screen unit 1100 is switched to the open mode.

For example, the first hook 1110 may be fixed onto a lower fixing end 12 of the cockpit module 10 and the second hook 1120 may be fixed onto an upper fixing end 11 of the cockpit module 10.

Second Embodiment (Basic Configuration and Operation Mechanism)

FIGS. 12 to 15 illustrate components of a display apparatus for a vehicle according to a second embodiment of the present disclosure and a relationship between operations of the components.

Figure 12:
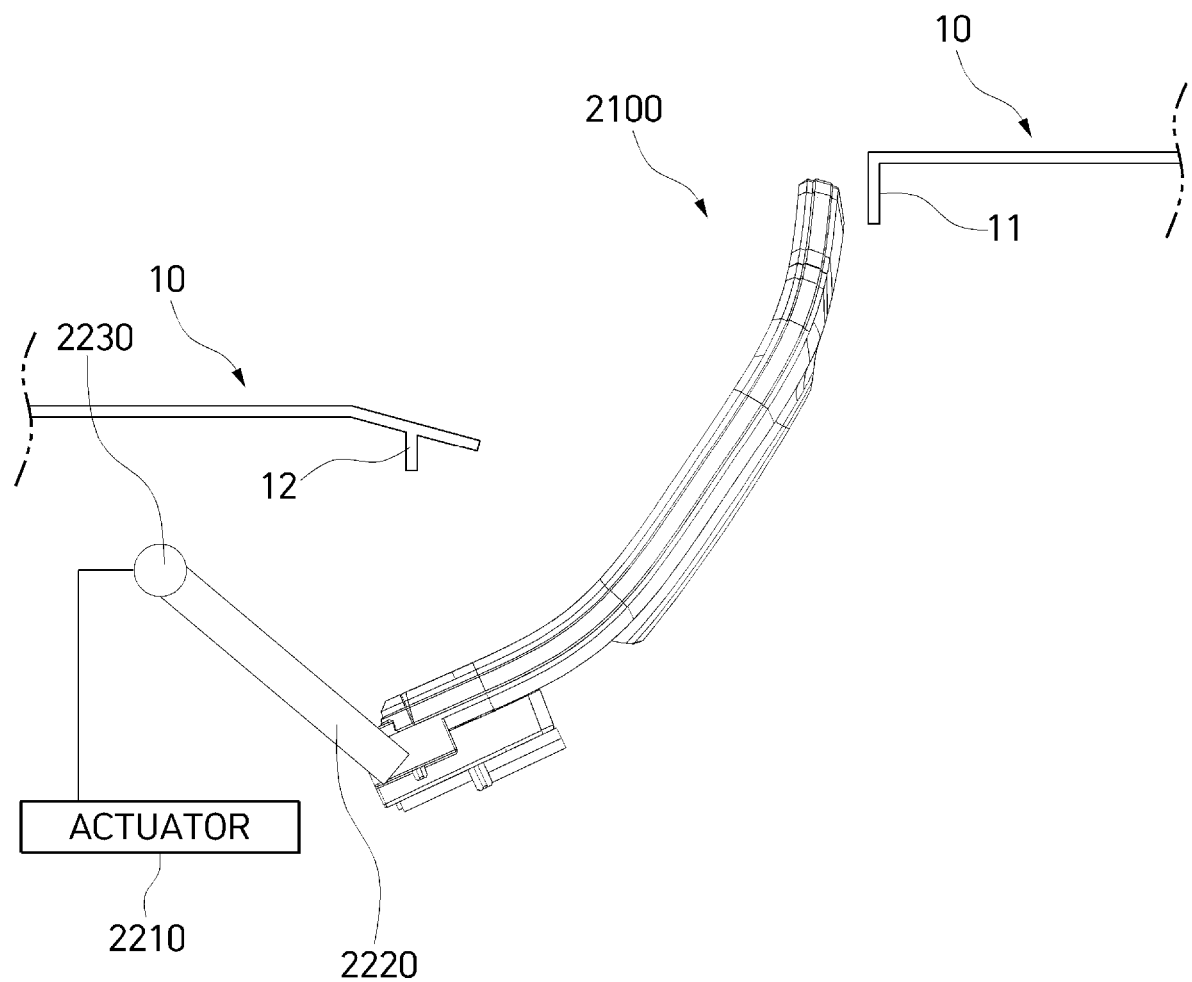
FIGS. 12 and 13 are side views schematically illustrating an operation mechanism of a display apparatus for a vehicle according to a second embodiment of the present disclosure.
Figure 13:
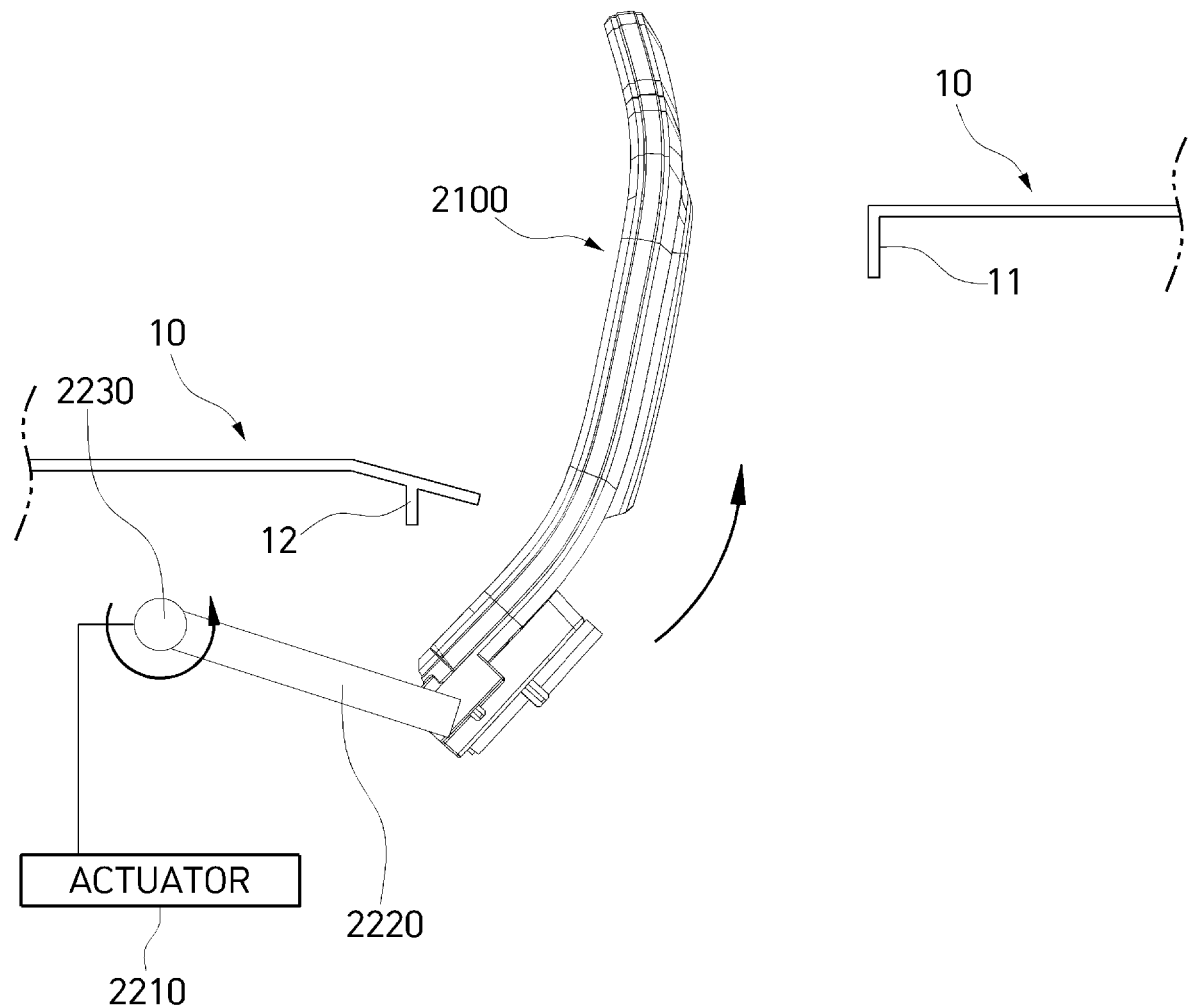
Figure 14:
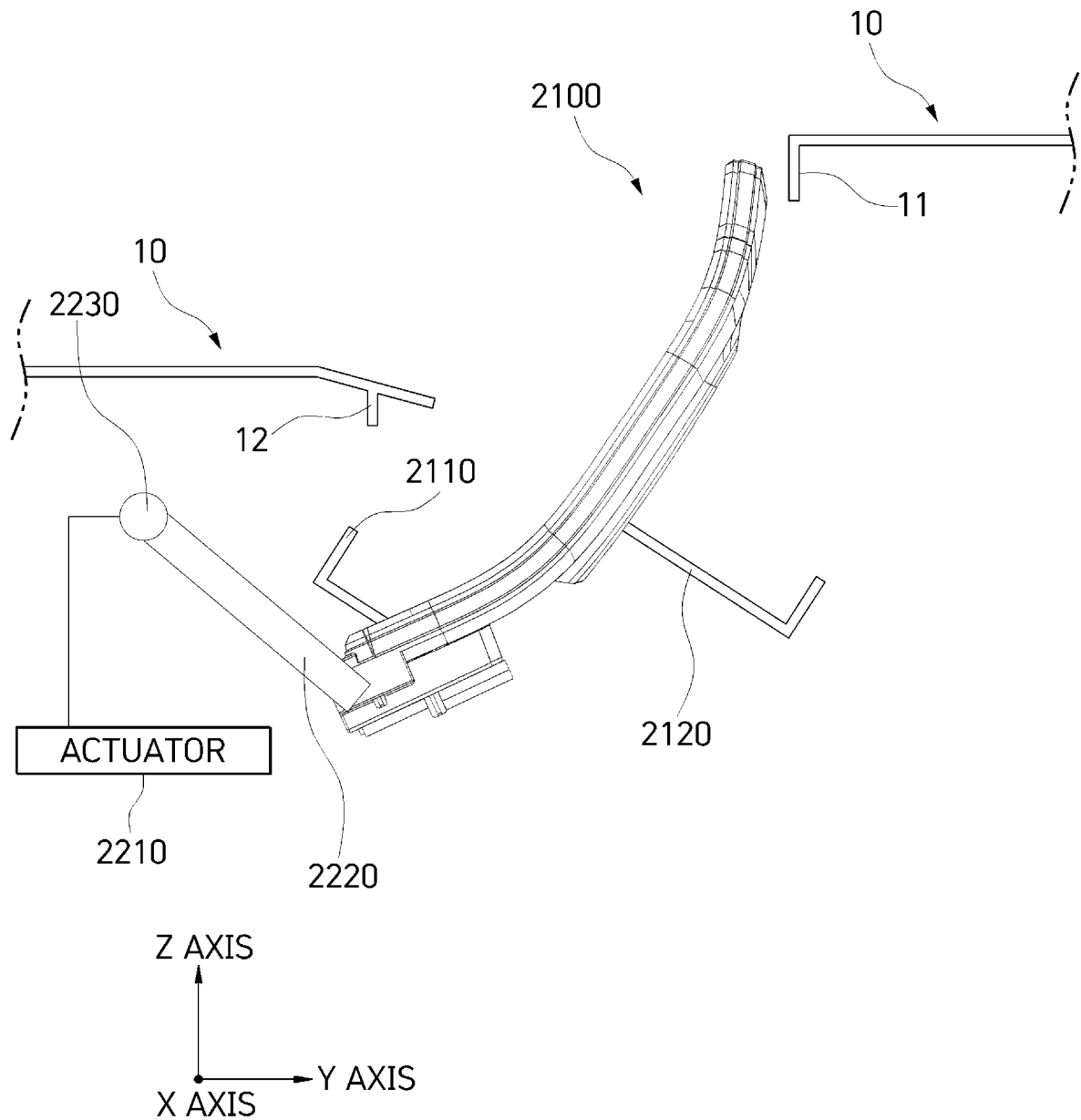
FIGS. 14 and 15 are side views schematically showing an operation mechanism of a display apparatus for a vehicle according to a modified example of the second embodiment of the present disclosure.
Figure 15:
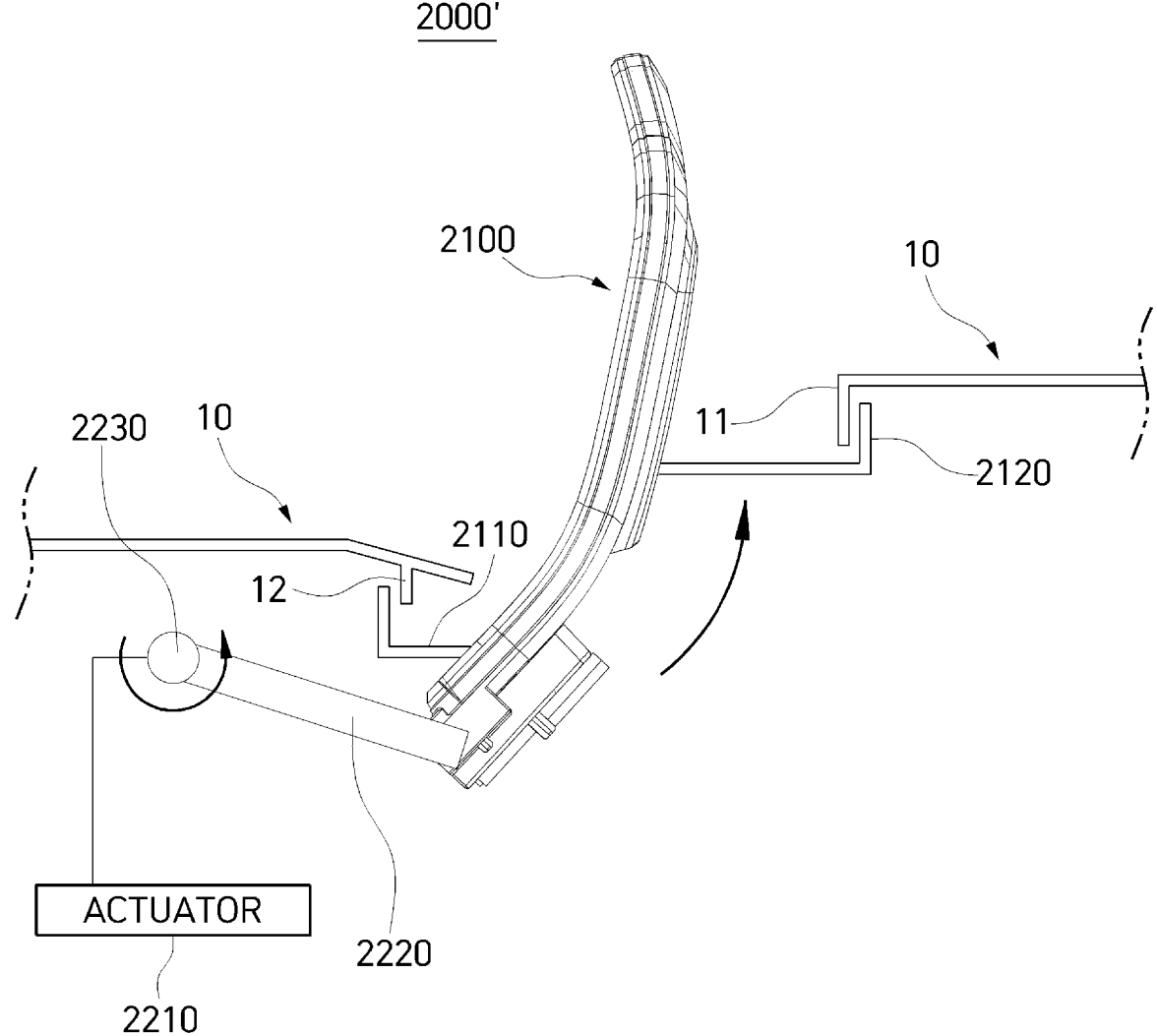

First, referring to FIGS. 12 and 13, a display apparatus 200 for a vehicle according to the second embodiment includes a screen unit 2100 and a driving unit 2200.

The screen unit 2100 outputs a corresponding image according to the closed mode in which some regions of the screen unit 2100 are exposed on a cockpit module 10 or the open mode in which all regions of the screen unit 2100 are exposed on the cockpit module 10.

In this case, the position of the screen unit 1100 is adjusted by the driving unit 2200 to selectively control a range of exposure of a display area, and a predetermined image may be output according to the range of exposure of the display area.

The driving unit 2200 may adjust a position of the screen unit 2100 according to a mode while rotating in the cockpit module 10 according to a predetermined logic.

The driving unit 2200 includes an actuator 2210, a connecting rod 2220, and a hinge shaft 2230.

The actuator 2210 has a drive shaft (not shown).

The connecting rod 2220 is connected between the drive shaft and the screen unit 2100.

The hinge shaft 2230 connects the drive shaft and the connecting rod 2220 of the actuator 2210.

The hinge shaft 2230 may be fixed at predetermined angles to adjust the position of the screen unit 2100.

The screen unit 2100 may further include a first hook 2110 and a second hook 2120 at front and rear sides thereof to be snap-fit-fastened with the cockpit module 10 in the open mode, thereby securing rigidity.

According to the present disclosure, a display apparatus for a vehicle is capable of selectively controlling exposure of a display area of a screen unit, thereby securing convenience and safety.

In particular, according to the present disclosure, different operation information and infotainment information can be provided according to a degree of exposure of the display area of the screen unit.

In addition, according to the present disclosure, durability can be maintained through a reinforcing structure using hooks when shaking occurs due to an external force.

The present disclosure is not limited to the above-described embodiments and may be implemented in various forms within an allowable range of the technical idea of the present disclosure.

Driving Control Method of Vehicle Display

Figure 16:
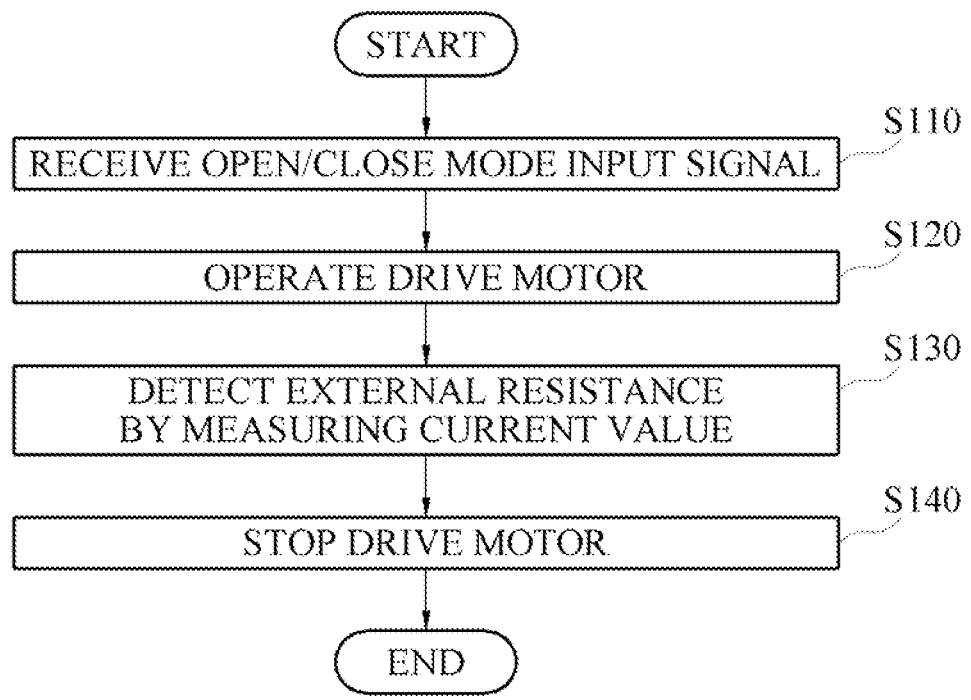
FIG. 16 is a schematic flowchart of a driving control method of a display of a vehicle according to an embodiment of the present disclosure.
Figure 17:
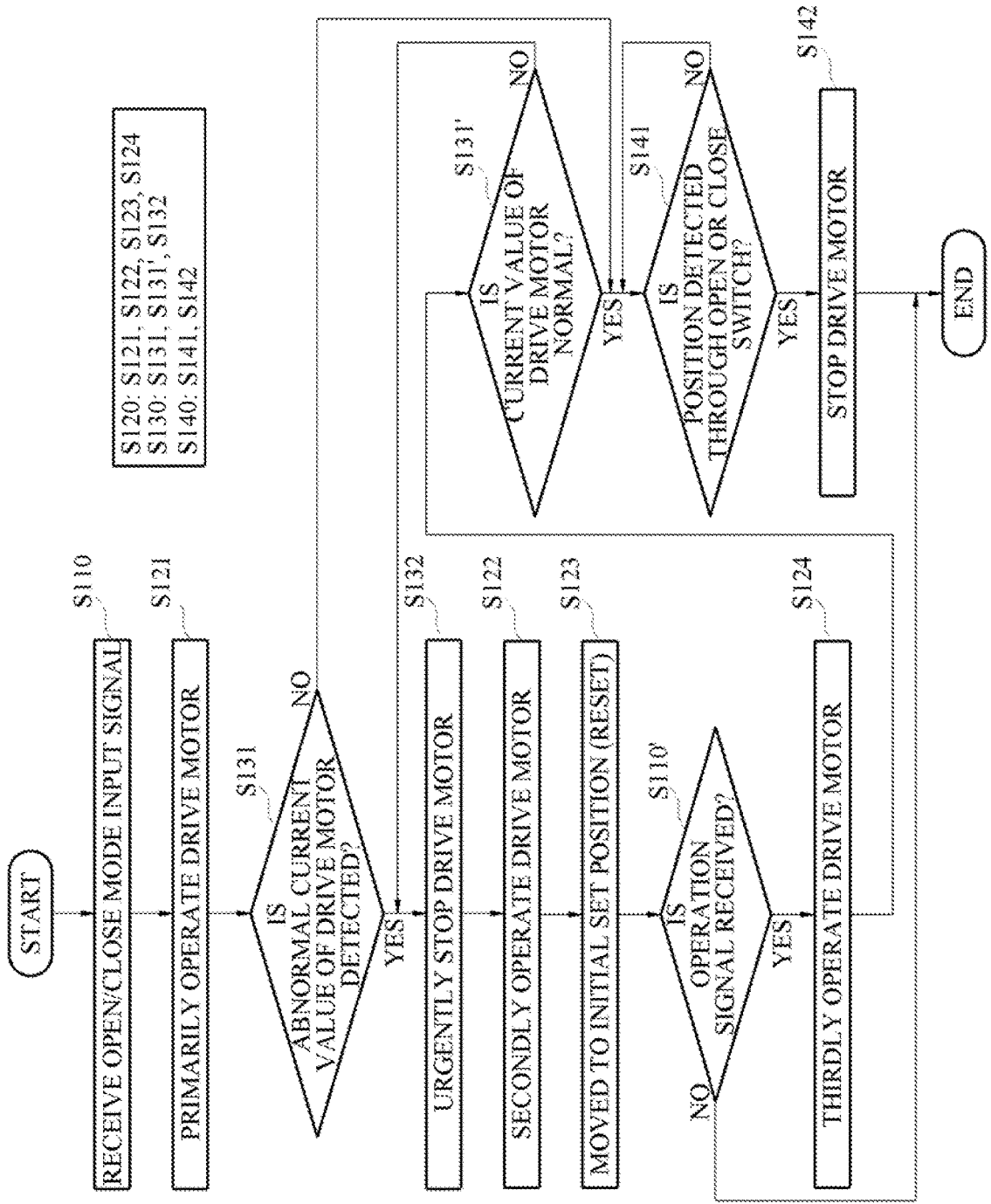
FIG. 17 is a detailed flowchart of a driving control method of a display of a vehicle according to an embodiment of the present disclosure.

FIGS. 16 and 17 are flowcharts of a driving control method of a display of a vehicle according to an embodiment of the present disclosure.

In FIGS. 16 and 17, the driving control method of a display of a vehicle largely includes receiving an open/closed mode input signal (S110), operating a drive motor (S120), detecting external resistance by measuring a current value (S130), and stopping the drive motor (S140).

The receiving of the open/closed mode input signal (S110) includes receiving an input signal selected for one of an open mode (e.g., an autonomous driving mode) and a closed mode (e.g., a normal driving mode) of a display of a vehicle.

The operating of the drive motor (S120) includes operating a drive motor of the display to move the display to a preset target position according to the input signal for each of the modes.

The detecting of the external resistance (S130) may include detecting external resistance by measuring whether a current value of the drive motor is abnormal.

The stopping of the drive motor (S140) may include stopping the drive motor after the display reaches the preset target position.

The above-described operations will be described in detail according to time with reference to FIG. 17 below.

The basic concept of the present embodiment is as follows. When the display is popped up according to the open or closed mode, a current value of the drive motor is measured when a load is applied to the drive motor due to an external force (external resistance). Thereafter, when the measured current value does not fall within a range of a reference current value, it is determined that a load is applied (external resistance occurs) and thus the operation of the drive motor is stopped. After the operation of the drive motor is stopped, the drive motor is operated to move the display to an initial position according to a reset input value (input) of a driver of the vehicle (including a passenger).

As shown in FIG. 17, when the driver sets the display to the open or closed mode according to the purpose, an input signal selected for the set mode is received (S110). For example, in operation S110, an input signal for the open mode is received when it is assumed that the driver sets the display to the open mode, and an input signal for the closed mode is received when it is assumed that the driver sets the display to the closed mode.

The drive motor is primarily operated according to the input signal for each mode (S121). Next, a current value of the drive motor is measured to detect external resistance (S130). The detecting of the external resistance (S130) may include detecting whether the current value of the drive motor is abnormal (S131) and urgently stopping the drive motor (S132).

Whether the current value of the drive motor is abnormal is detected by comparing a measured current value of the drive motor with a reference current value (S131). For example, in operation S131, when it is assumed that the drive motor has a problem (e.g., overspecifications) at 250 mA (reference current value) or more, the occurrence of external resistance is detected when the measured current value of the drive motor is greater than 250 mA.

When a situation causing the occurrence of external resistance is detected, i.e., when the measured current value of the drive motor is greater than the reference current value, it is determined that external resistance occurs and thus the drive motor is urgently stopped (S132).

In this case, the urgent stopping of the drive motor (S132) may include transmitting a warning notification message and storing the warning notification message.

In the transmitting of the warning notification message, the warning notification message is transmitted in the form of a screen and/or voice to a passenger in the vehicle of a current situation after the drive motor is urgently stopped for a preset time.

The storing of the warning notification message includes transmitting the warning notification message to the server to be stored in the server. This operation may be meaningful because the warning notification message may be used as big data in the future.

After the urgently stopping of the drive motor (S132), the drive motor is secondly operated immediately (S122), and the display is moved to a preset initial position according to a preset initial position input signal for the display to reset the display (S123).

As another example, when a certain time elapses or when the measured current value falls within the range of the reference current value, the urgently stopped drive motor may be secondly operated (S122).

The preset initial position of the reset display may be a start position in the open or closed mode. This is because the display is reset to any one mode and thus the driver may set the display to the open or closed mode again to receive a corresponding operation signal (S110') or the driving control method may be ended.

For example, when the driver wants to enter the open mode while the display is reset to the closed mode, the driver should select the open mode to operate the drive motor again. That is, when the operation signal is received after the driver reselects one of the modes (S110'), the drive motor is thirdly operated (S124).

Thereafter, a current value of the drive motor is measured again to determine whether the current value is abnormal (S131'), and when it is determined that the current value is not abnormal, the drive motor is moved to a target position and arrival of the display is detected at a target position through an open or close switch (S141). When in operation S141, a position of the display is not detected through the open or close switch, the drive motor is operated until the position of the display is detected. As a result, when the display reaches the target position, the drive motor is stopped (S142).

When the re-measured current value of the drive motor is abnormal, it is determined that the drive motor is still influenced by an external force and thus the drive motor is urgently stopped (S132) and a subsequent operation is performed.

Figure 18:
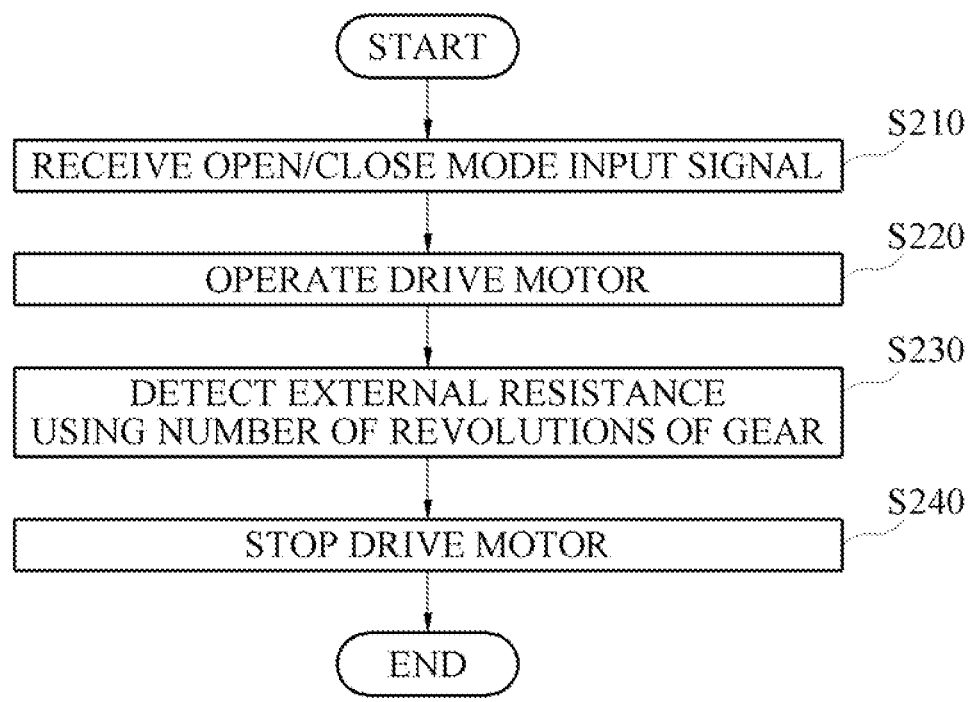
FIG. 18 is a schematic flowchart of a driving control method of a display of a vehicle according to another embodiment of the present disclosure.
Figure 19:
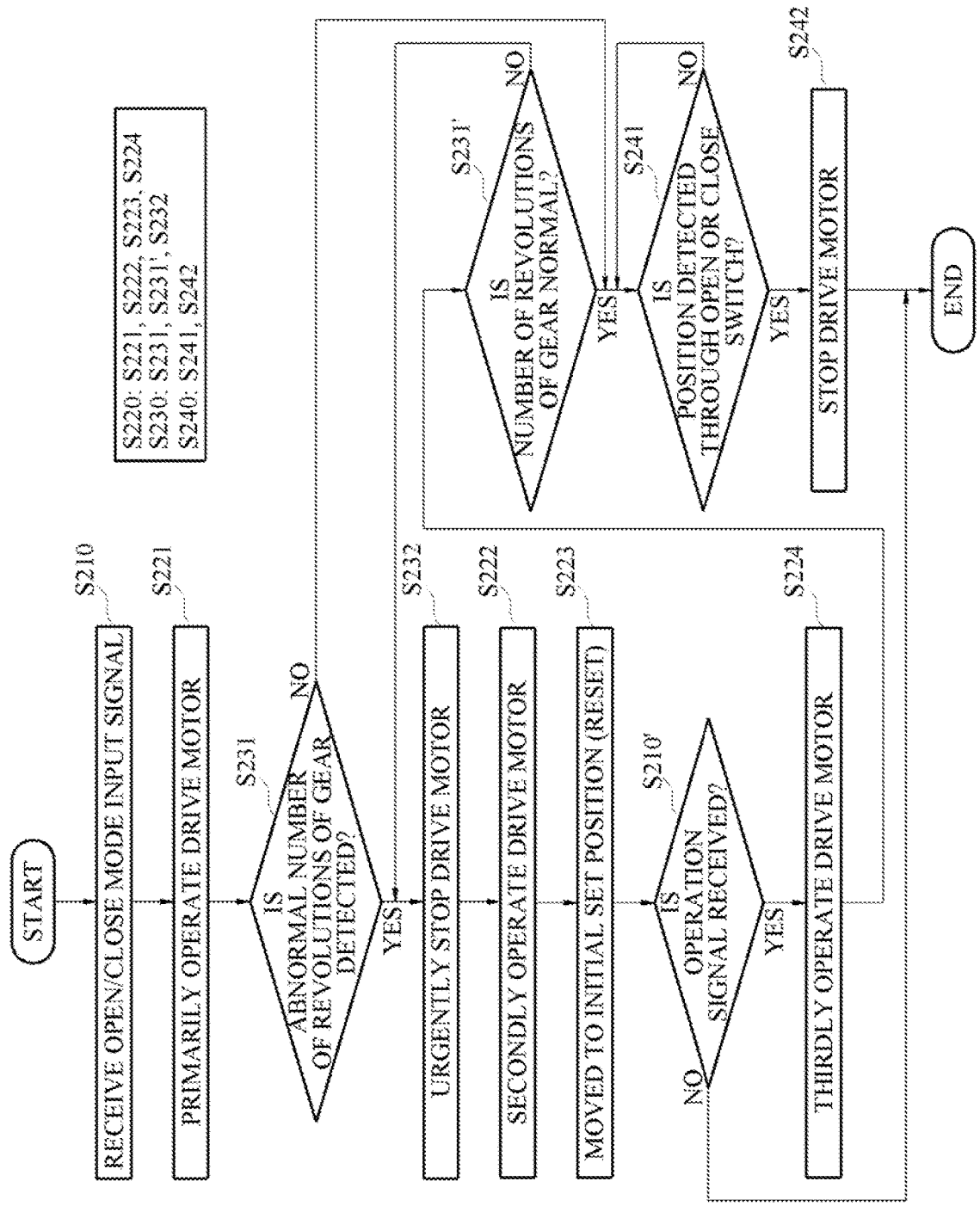
FIG. 19 is a detailed flowchart of a driving control method of a display of a vehicle according to another embodiment of the present disclosure.

FIGS. 18 and 19 are flowcharts of a driving control method of a display of a vehicle according to another embodiment of the present disclosure.

In FIGS. 18 and 19, the driving control method of a display of a vehicle largely includes receiving an open/closed mode input signal (S210), operating a drive motor (S220), detecting external resistance using the number of revolutions of a gear (S230), and stopping the drive motor (S240).

The receiving of the open/closed mode input signal (S210) includes receiving an input signal selected for one of an open mode (e.g., an autonomous driving mode) and a closed mode (e.g., a normal driving mode) of the display of the vehicle.

The operation of the drive motor (S220) includes operating a drive motor of the display to move the display to a preset target position according to the input signal for each mode.

The detecting of the external resistance (S230) may include detecting external resistance by measuring whether the number of revolutions of a gear of the drive motor is abnormal.

The stopping of the drive motor (S240) may include stopping the drive motor after the display reaches the preset target position.

The above-described operations will be described in detail according to time with reference to FIG. 19 below.

The basic concept of the present embodiment is as follows. When the display is popped up according to the open or closed mode, the number of revolutions of the gear of the drive motor per second is measured when a load is applied to the drive motor due to an external force (external resistance). Thereafter, when the number of revolutions per second is less than a preset reference value, it is determined that a load is applied (external resistance is generated) and thus the operation of the drive motor is stopped. After the operation of the drive motor is stopped, the drive motor is operated to move the display to an initial position according to a reset input value (input) from a driver of the vehicle (including a passenger).

As shown in FIG. 19, when the driver sets the display to the open or closed mode according to the purpose, an input signal selected for the set mode is received (S210). For example, in operation S210, an input signal for the open mode is received when it is assumed that the driver sets the display to the open mode, and an input signal for the closed mode is received when it is assumed that the driver sets the display to the closed mode.

The drive motor is primarily operated according to the input signal for each mode (S221). Next, the number of revolutions of the gear of the drive motor per second is measured to detect external resistance (S230). The detecting of the external resistance (S230) may include detecting whether the number of revolutions of the gear of the drive motor is abnormal (S231) and urgently stopping the drive motor (S232).

The number of revolutions of the gear of the drive motor is compared with a preset reference value (reference number of revolutions) to detect whether the number of revolutions of the gear of the drive motor is abnormal (S231). For example, in operation S231, it is determined that external resistance occurs when the preset reference number of revolutions of the drive motor per second is 10 and a measured number of revolutions of the gear per second is 7 or less.

When a situation causing the generation of external resistance is detected, i.e., when the number of revolutions of the gear of the drive motor per second is less than the preset reference number of revolutions, it is determined that external resistance occurs, and thus the drive motor is urgently stopped (S232).

In this case, the urgent stopping of the drive motor (S232) may include transmitting a warning notification message and storing the warning notification message.

In the transmitting of the warning notification message, the warning notification message is transmitted in the form of a screen and/or voice to a passenger in the vehicle of a current situation after the drive motor is urgently stopped for a preset time.

The storing of the warning notification message includes transmitting the warning notification message to the server to be stored in the server. This operation may be meaningful because the warning notification message may be used as big data in the future.

After the urgently stopping of the drive motor (S232), the drive motor is secondly operated immediately (S222), and the display is moved to a preset initial position according to a preset initial position input signal for the display to reset the display (S223).

As another example, when a certain time elapses or when a measured number of revolutions of the gear is less than the reference value, the urgently stopped drive motor may be secondly operated (S222).

The preset initial position in a reset state of the display is reset may be a start position in the open or closed mode. This is because the display is reset to one of the open mode and the closed mode and thus the driver may set the display to the other mode again to receive a corresponding operation signal (S210') or the driving control method may be ended.

For example, when the driver wants to enter the open mode while the display is reset to the closed mode, the driver should select the open mode to operate the drive motor again. That is, when the operation signal is received after the driver reselects one of these modes (S210'), the drive motor is thirdly operated (S224).

Thereafter, the number of revolutions of the gear of the drive motor per second is measured again to determine whether the number of revolutions of the gear is abnormal (S231'), and when it is determined that the number of revolutions is not abnormal, the drive motor is moved to a target position and arrival of the display is detected at a target position through an open or close switch (S241). When in operation S241, a position of the display is not detected through the open or close switch, the drive motor is operated until the position of the display is detected. When the display reaches the target position, the drive motor is stopped (S242).

When the re-measured number of revolutions of the gear of the drive motor per second is abnormal, it is determined that the drive motor is still influenced by an external force and thus the drive motor is urgently stopped (S232) and a subsequent operation is performed.

Figure 20:
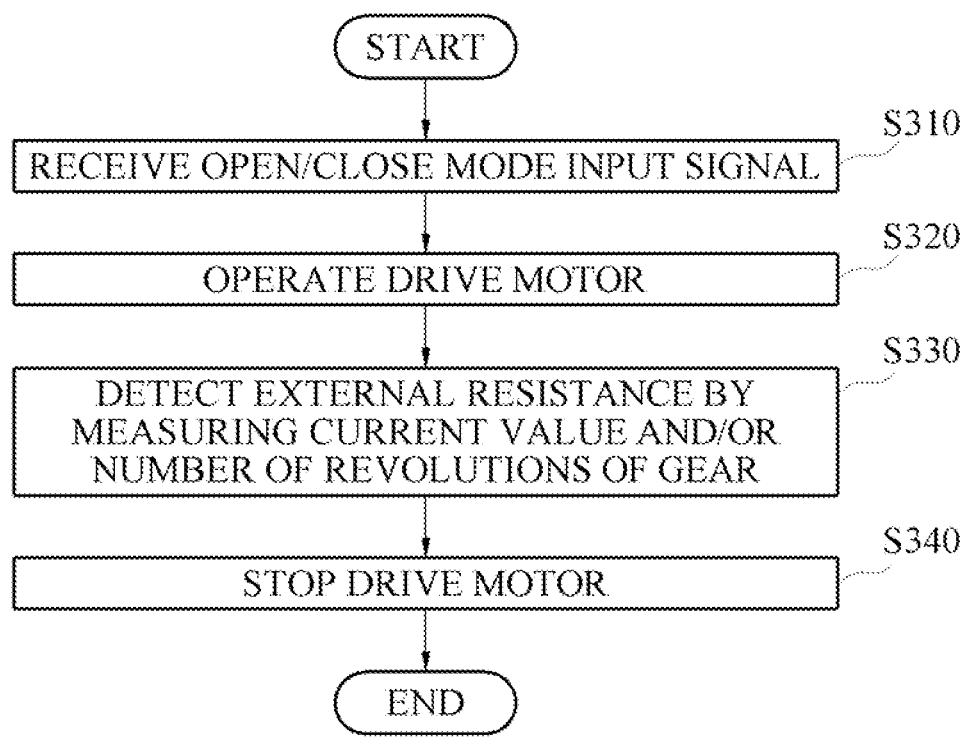
FIG. 20 is a schematic flowchart of a driving control method of a display of a vehicle according to another embodiment of the present disclosure.
Figure 21:
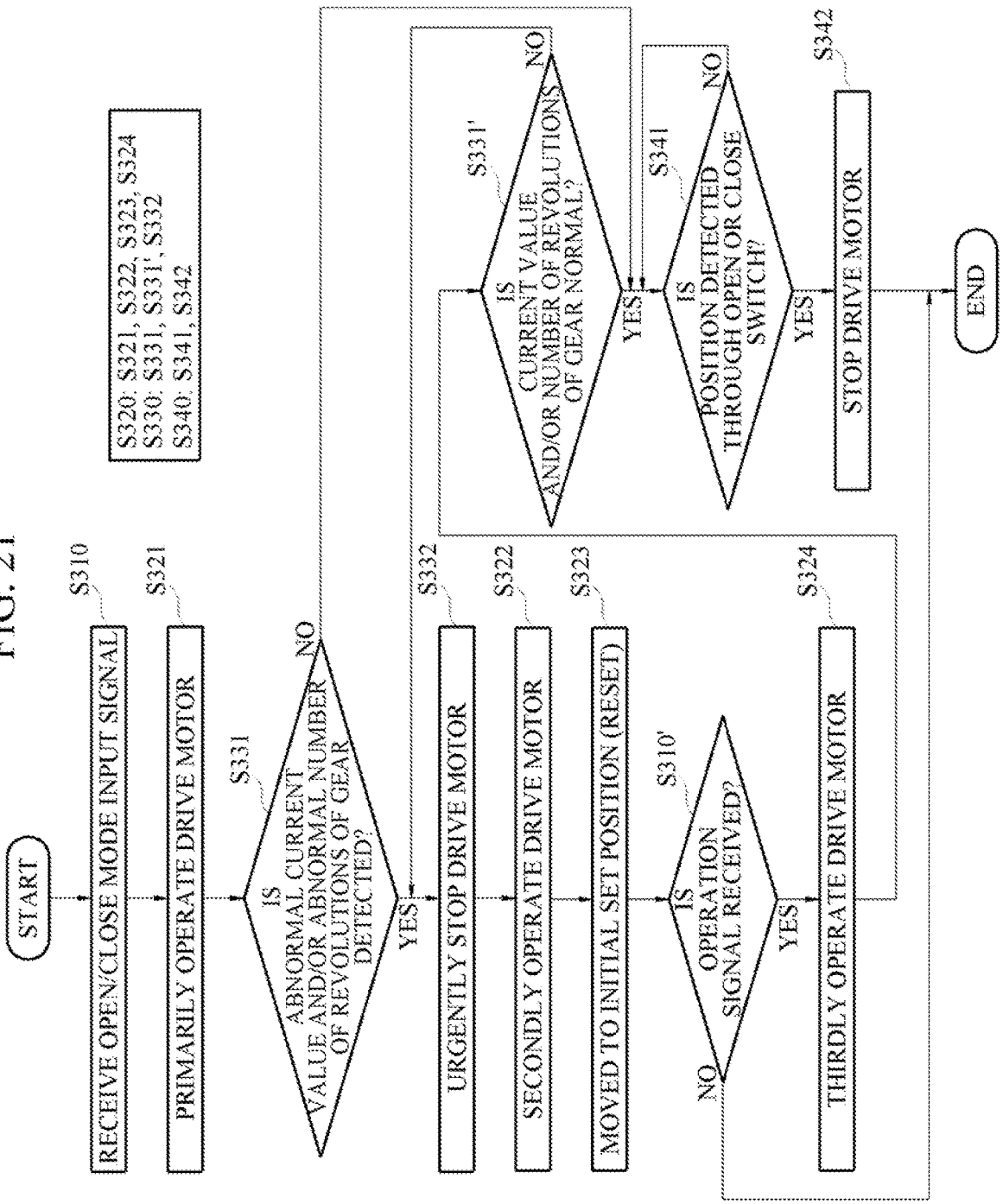
FIG. 21 is a detailed flowchart of a driving control method of a display of a vehicle according to another embodiment of the present disclosure.

FIGS. 20 and 21 are flowcharts of a driving control method of a display of a vehicle according to another embodiment of the present disclosure.

In FIGS. 20 and 21, the driving control method of a display of a vehicle largely includes receiving an open/closed mode input signal (S310), operating a drive motor (S320), detecting external resistance by measuring a current value and/or the number of revolutions of a gear (S330), and stopping the drive motor (S340).

The receiving of the open/closed mode input signal (S310) includes receiving an input signal selected for one of an open mode (e.g., an autonomous driving mode) and a closed mode (e.g., a normal driving mode) of a display of a vehicle.

The operating of the driving motor (S320) includes operating a driving motor of the display to move the display to a preset target position according to the input signal for each mode.

The detecting of the external resistance (S330) may include detecting external resistance by checking whether a measured current value of the drive motor and/or the number of revolutions of a gear of the drive motor is abnormal.

The stopping of the drive motor (S340) may include stopping the drive motor after the display reaches the preset target position.

The above-described operations will be described in detail according to time with reference to FIG. 21 below.

The basic concept of the present embodiment is as follows. When the display is popped up according to the open or closed mode, a current value of the drive motor and the number of revolutions of the gear of the drive motor per second is measured when a load is applied to the drive motor due to an external force (external resistance). Thereafter, when the measured current value does not fall within a range of a reference current value or the number of revolutions of the gear per second is less than a preset reference value, it is determined that a load is applied (external resistance occurs) and thus the operation of the drive motor is stopped. After the operation of the drive motor is stopped, the drive motor is operated to move the display to an initial position according to a reset input value (input) from a driver of the vehicle (including a passenger).

As shown in FIG. 21, when the driver sets the display to the open or closed mode according to the purpose, an input signal selected for the set mode is received (S310). For example, in operation S310, an input signal for the open mode is received when it is assumed that the driver sets the display to the open mode, and an input signal for the closed mode is received when it is assumed that the driver sets the display to the closed mode.

The drive motor is primarily operated according to the input signal for each mode (S321). Next, a current value of the drive motor and/or the number of revolutions of the gear is measured to detect external resistance (S330). The detecting of the external resistance (S330) may include detecting whether the current value of the drive motor and/or the number of revolutions of the gear is abnormal (S331) and urgently stopping the drive motor (S332).

Whether the current value of the drive motor and/or the number of revolutions of the gear is abnormal is detected by comparing a measured current value of the drive motor with a reference current value and/or comparing the number of revolutions of the gear with a reference value (reference number of revolutions) (S331). For example, in operation S331, when it is assumed that the drive motor has a problem (e.g., over specifications) at 250 mA (reference current value) or more, the occurrence of external resistance is detected when the measured current value of the drive motor is greater than 250 mA. In addition, the occurrence of external resistance is detected when the reference number of revolutions of the drive motor per second is 10 and a measured number of revolutions of the gear per second is 7 or less.

When a situation causing the occurrence of external resistance is detected, i.e., when the measured current value of the drive motor is greater than the reference current value or when the number of revolutions of the gear per second is less than a preset reference number of revolutions, it is determined that external resistance occurs and thus the drive motor is urgently stopped (S332).

In this case, the urgent stopping of the drive motor (S332) may include transmitting a warning notification message and storing the warning notification message.

In the transmitting of the warning notification message, the warning notification message is transmitted in the form of a screen/or voice to a passenger in the vehicle of a current situation after the drive motor is urgently stopped for a preset time.

The storing of the warning notification message includes transmitting the warning notification message to the server to be stored in the server. This operation may be meaningful because the warning notification message may be used as big data in the future.

Meanwhile, after the urgently stopping of the drive motor (S332), the drive motor is secondly operated immediately (S322), and the display is moved to a preset initial position according to a preset initial position input signal for the display to reset the display (S323).

As another example, the urgently stopped drive motor may be secondly operated, when a certain time elapses, when a measured current value is greater than the reference current value, or when the number of revolutions of the gear per second is less than the reference value (S322).

The preset initial position of the reset display may be a start position in the open or closed mode. This is because the display is reset to one of the open mode and the closed mode and thus the driver may set the display to the other mode again to receive a corresponding operation signal (S310') or the driving control method itself may be ended.

For example, when the driver wants to enter the open mode while the display is reset to the closed mode, the driver should reselect the open mode to operate the drive motor again. That is, when the operation signal is received after the driver reselects one of the modes (S310'), the drive motor is thirdly operated (S324).

Thereafter, a current value of the drive motor and/or the number of revolutions of the gear per second is measured again to determine whether the current value and/or the number of revolutions of the gear is abnormal (S331'), and when it is determined that the current value and/or the number of revolutions of the gear is normal, the drive motor is moved to a target position and arrival of the display is detected at a target position through an open or close switch (S341). When in operation S341, a position of the display is not detected through the open or close switch, the drive motor is operated until the position of the display is detected. As a result, when the display reaches the target position, the drive motor is stopped (S342).

When the re-measured current value of the drive motor and/or the number of revolutions of the gear per second is abnormal, it is determined that the drive motor is still influenced by an external force and thus the drive motor is urgently stopped (S332) and a subsequent operation is performed.

Figure 22:
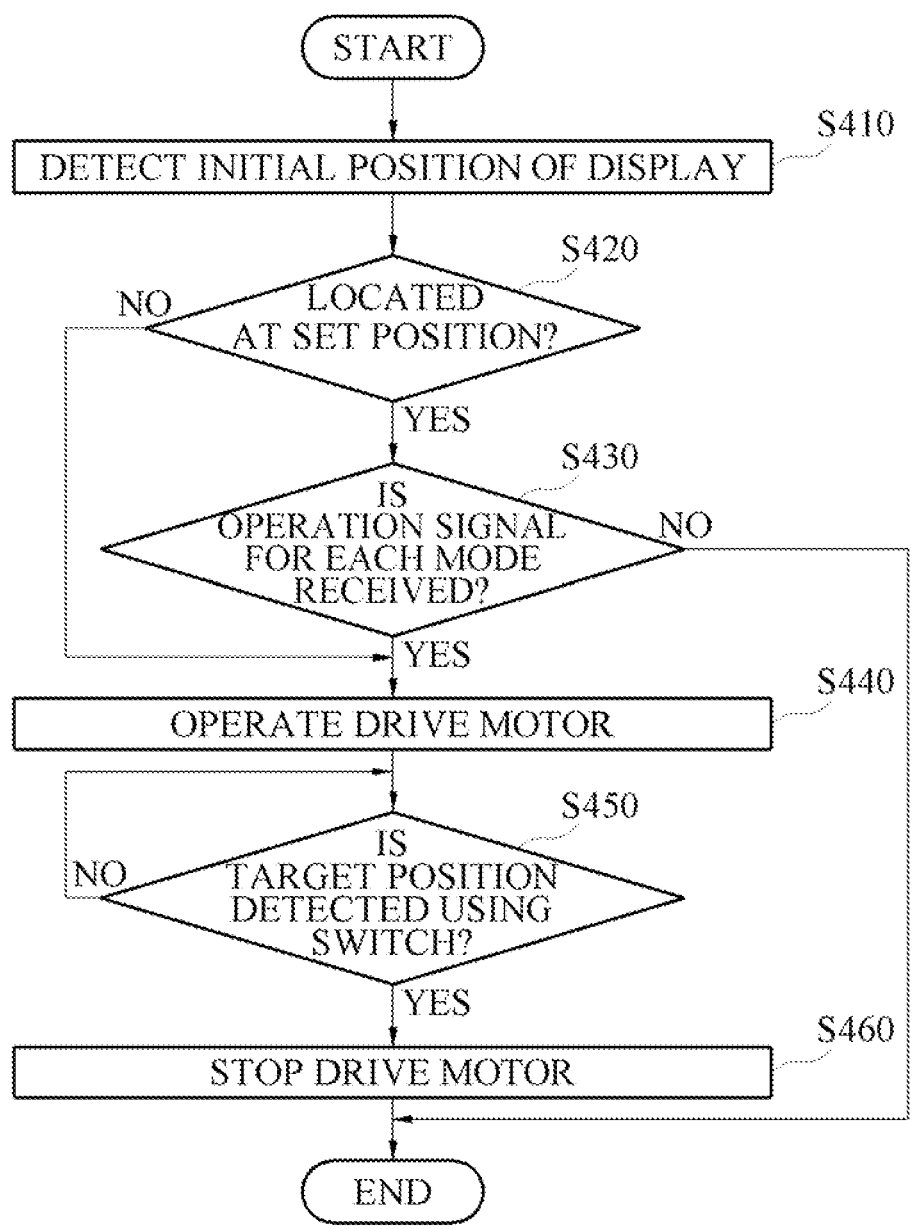

FIG. 22 is a flowchart of a position control method of a display of a vehicle according to another embodiment of the present disclosure.

The position control method of a display of a vehicle according to the present embodiment largely includes detecting an initial position of the display (S410), comparing the initial position of the display with a set position (S420), receiving an open/closed mode input signal (S430), operating a drive motor (S440), detecting a target position using a switch (450), and stopping the drive motor (S460).

The detecting of the initial position of the display (S410) includes checking an on-state of an open/close switch and receiving a positional signal of the display in real time.

The checking of the on-state of the open/close switch includes checking an on-state of an open or close switch provided at a point where the set display is located after the start of the vehicle. In operation S410, the initial position may be a start or end point of an open or closed mode.

The comparing of the initial position of the display with the set position (S420) includes comparing the initial position of the display with a preset position. When the initial position of the display does not match the set position, additional control is not necessary. However, when the driver sets the open or closed mode to selectively set a position different from an initial position, an operation signal required for the open or closed mode may be additionally received.

The receiving of the open/closed mode input signal (S430) includes receiving an input signal selected for one of an open mode (e.g., an autonomous driving mode) and a closed mode (e.g., a normal driving mode) of a display of a vehicle.

The operating of the drive motor (S440) includes operating a drive motor of the display to move (pop up) the display to a preset target position according to the input signal for each mode.

The detecting of the target position using a switch (S450) includes detecting the target position of the display through an open switch or a close switch located at an end point of each mode.

The stopping of the drive motor (S460) may include stopping the drive motor after the display reaches the target position.

Figure 23:
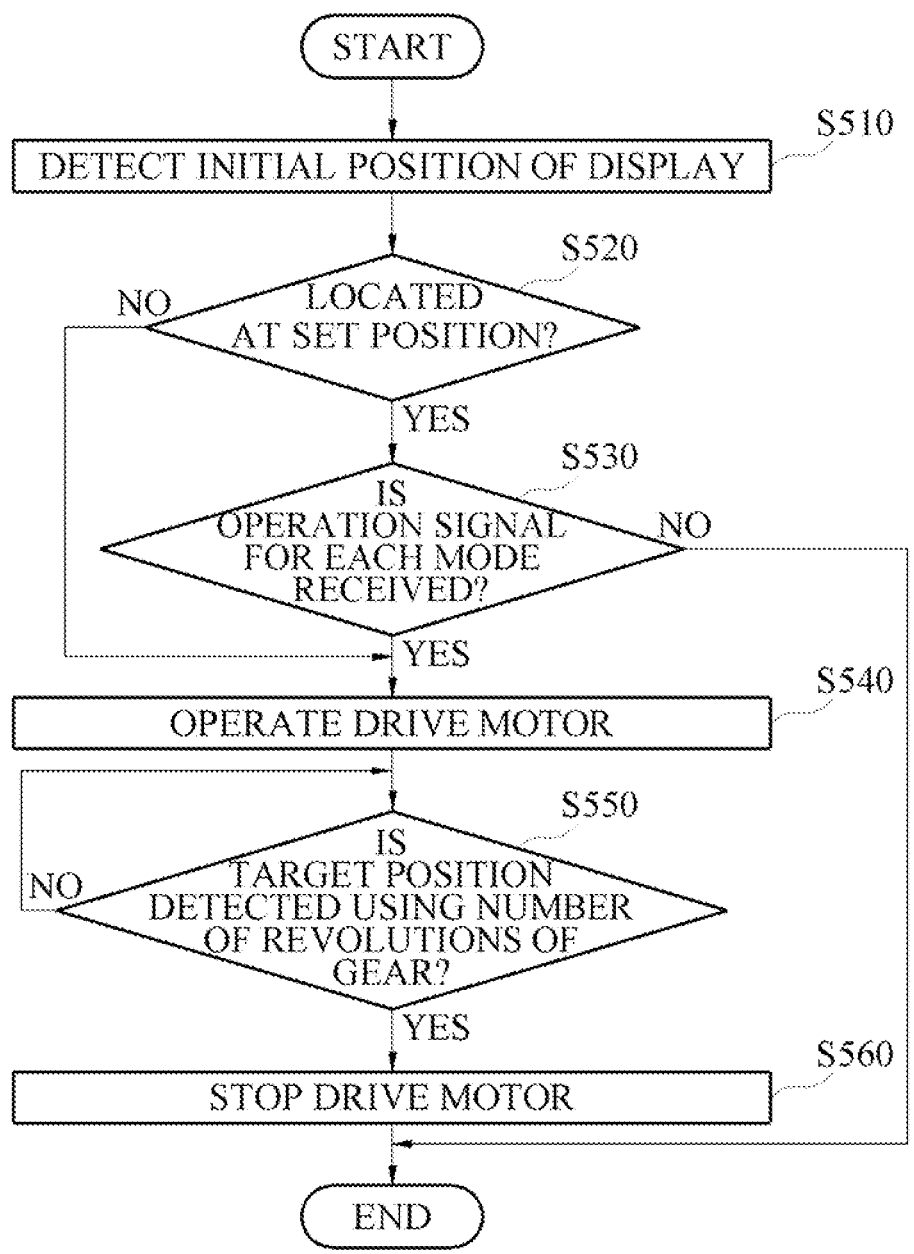

FIG. 23 is a flowchart of a position control method of a display of a vehicle according to another embodiment of the present disclosure.

The position control method of a display of a vehicle according to the present embodiment largely includes detecting an initial position of the display (S510), comparing the initial position of the display with a set position (S520), receiving an open/closed mode input signal (S530), operating a drive motor (S540), detecting a target position using the number of revolutions of a gear (S550), and stopping the drive motor (S560).

The detecting of the initial position of the display (S510) of the display includes detecting a position of the display preset by a driver or an initial position of the display when the vehicle is turned off.

The comparing the initial position of the display with the set position (S520) includes comparing the initial position of the display with a preset position. In particular, after detecting an initial position of the display that is set after the vehicle is turned on, the initial position is compared with a preset setting position of the display. Here, the set position may be a start or end point in an open or closed mode. When the initial position of the display does not match the set position, additional control is not necessary.

The receiving of the open/closed mode input signal (S530) includes receiving an input signal selected for one of the open mode (e.g., an autonomous driving mode) and the closed mode (e.g., a normal driving mode) of the display of the vehicle.

The operating of the drive motor (S540) includes operating the drive motor of the display to move the display to a preset target position according to the input signal for each mode.

The detecting of the target position using the number of revolutions of the gear (S550) includes calculating the number of revolutions of the gear of the drive motor per second on the basis of an interval between the positions of the display in a movement path to detect a position of the display in real time.

The stopping of the drive motor (S560) includes detecting a position of the display in real time using the number of revolutions of the gear of the drive motor and stopping the drive motor when the display reaches the target position using the number of revolutions of the gear of the drive motor.

In the stopping of the drive motor (S560), the operation of the drive motor may be stopped when the number of revolutions of the gear of the drive motor per second reaches a preset reference number of revolutions.

The stopping of the drive motor (S560) may include comparing the number of revolutions of the gear of the drive motor with a reference value and detecting whether the number of revolutions of the gear of the drive motor is abnormal on the basis of a result of the comparison.

FIG. 24 is a flowchart of a position control method of a display of a vehicle according to another embodiment of the present disclosure.

The position control method of a display of a vehicle according to the present embodiment largely includes detecting an initial position of the display (S610), comparing the initial position of the display with a set position (S620), receiving an open/closed mode input signal (S630), operating a drive motor (S640), detecting a target position using the number of revolutions of a gear (S650), detecting a target position using a switch (S660), and stopping the drive motor (S670).

The detecting of the initial position of the display (S610) includes detecting an initial position of the display on the basis of a switch for each mode, which is located at a start or end point in the open or closed mode, and the number of revolutions of the gear of the drive motor of the display of the vehicle.

The comparing the initial position of the display with the set position (S620) includes comparing the initial position of the display with a preset position. In particular, after detecting an initial position of the display that is set after the vehicle is turned on, the initial position is compared with a preset setting position of the display. Here, the set position may be a start or end point in an open or closed mode. When the initial position of the display does not match the set position, additional control is not necessary.

The receiving of the open/closed mode input signal (S630) includes receiving an input signal selected for one of the open mode (e.g., an autonomous driving mode) and the closed mode (e.g., a normal driving mode) of the display of the vehicle.

The operating of the drive motor (S640) includes operating the drive motor of the display to move the display to a preset target position according to the input signal for each mode.

The detecting of the target position using the number of revolutions of the gear (S650) includes calculating the number of revolutions of the gear of the drive motor per second on the basis of an interval between the positions of the display in a movement path to detect a position of the display in real time.

The detection of the target position using a switch (S660) includes detecting the target position of the display through an open switch or a close switch located at an end point of each mode.

The stopping of the drive motor (S670) includes detecting a position of the display in real time using the number of revolutions of the gear of the drive motor and stopping the drive motor when the display reaches the target position using the number of revolutions of the gear of the drive motor and/or the detection of an open/close switch.

The stopping of the drive motor (S670) includes stopping the drive motor after the target position of the display is detected using the open/close switch and/or the number of revolutions of the gear of the drive motor per second.

According to the present disclosure, a position of a display of a vehicle can be accurately controlled in each mode to secure driving stability, and the operation of a drive motor of the display can be urgently stopped when an external force is applied (e.g., when the display is forcibly pressed by a user or when the user's hand is caught into a gap), thereby securing safety.

In particular, a display region of a screen can be controlled according to an open mode (e.g., an autonomous driving mode) or a close mode (e.g., a normal driving mode) to appropriately provide content (e.g., a driving option display, infotainment information, etc.).

Furthermore, durability can be maintained through an additional reinforcement structure using a hook when shaking occurs due to an external force, and damage to and malfunction of a device can be prevented by controlling a current value and/or an operation time.

Although the present disclosure has been described above in detail with reference to example embodiments, the embodiments are merely examples and various modifications and changes may be made within an allowable range of the scope the present disclosure.

Therefore, the scope of the present disclosure should be defined by the following claims.

What is claimed is:

1. A method of operating a display unit of a vehicle, the display unit comprising a screen unit and a driving unit attached to the screen unit and configured to move the screen unit along a screen unit moving path having top and bottom ends, the driving unit comprising a housing attached to a rear surface of the screen unit, a drive motor housed at the housing and configured to generate a driving force to move the housing, which causes the screen unit to move together with the housing along the screen unit moving path, an open switch disposed at a top portion of the housing and configured to move together with the housing and be activated when the screen unit is moved to the top end of the screen unit moving path, and a closed switch disposed at a bottom portion of the housing and configured to move together with the housing and be activated when the screen unit is moved to the bottom end of the screen unit moving path, the method comprising:
   receiving an input signal indicating a mode of the display unit, the mode being one of an open mode and closed mode;
   in response to receiving the input signal, operating the drive motor to move the screen unit to a preset target position corresponding to the mode indicated by the input signal;
   determining whether external resistance is applied to the screen unit while the screen unit is being moved; and
   in response to determining that the external resistance is applied to the screen unit while the screen unit is being moved, stopping the drive motor,
   wherein determining whether the external resistance is applied comprises:
      measuring a first current value of the drive motor while the drive motor is being operated;
      measuring a second current value while the drive motor is stopped;
      measuring a third current value indicating a difference between the first and second current values;
      comparing the measured third current value to a reference current value; and
      in response to the measured third current value being greater than the reference current value, determining that the external resistance is detected, and
   wherein stopping the drive motor comprises:
      detecting a target position for each of the open and closed modes by detecting a target position of the screen unit based on whether the open or closed switch is activated; and
      stopping the drive motor after detecting the target position of the screen unit based on whether the open or closed switch is activated.

2. The method of claim 1, further comprising, in response to stopping the drive motor, performing a reset operation including:
   receiving an initial position input signal indicating an initial position of the screen unit; and
   moving the screen unit to the initial position.

3. The method of claim 2, wherein the initial position comprises a start position of the drive motor in the open or closed mode.

4. The method of claim 1, wherein stopping the drive motor comprises:
   outputting a warning notification to a passenger in the vehicle; and
   transmitting the warning notification to a server.

5. A method of operating a display unit of a vehicle, the display unit comprising a screen unit and a driving unit attached to the screen unit and configured to move the screen unit along a screen unit moving path having top and bottom ends, the driving unit comprising a housing coupled to a rear surface of the screen unit, a drive motor housed at the housing and configured to generate a driving force to move the housing, which causes the screen unit to move together with the housing along the screen unit moving path, an open switch disposed at a top portion of the housing and configured to move together with the housing and be activated when the screen unit is moved to the top end of the screen unit moving path, and a closed switch disposed at a bottom portion of the housing and configured to move together with the housing and be activated when the screen unit is moved to the bottom end of the screen unit moving path, the method comprising:
   detecting an initial position of the screen unit;
   comparing the initial position of the screen unit with a preset position;
   in response to the initial position corresponding to the preset position, receiving an input signal inducing a mode for the screen unit, the mode being one of an open mode and closed mode;
   operating the drive motor to move the screen unit to a target position corresponding to the mode indicated in the input; and
   stopping the drive motor after the screen unit reaches the target position,
   wherein detecting the initial position of the screen unit comprises:
      checking whether the open or closed switch is activated after the vehicle has been turned on; and receiving a positional signal of the screen unit from the open switch, and wherein the method further comprises detecting a target position in each of the open and closed modes between operating the drive motor and stopping the drive motor, detecting the target position in each of the open and closed modes comprising detecting a target position of the screen unit through the open or closed switch.

6. The method of claim 5, wherein the initial position comprises the top or bottom portion of the screen unit moving path in the open or closed mode.

7. The method of claim 5, wherein stopping the drive motor comprises:

detecting a position of the screen unit based on a first number of revolutions of a gear of the drive motor; and stopping the drive motor based on a second number of revolutions of the gear of the drive motor when the screen unit reaches the target position.

8. The method of claim 7, further comprising detecting a position of the screen unit between while the drive motor is being operated and while the drive motor is stopped, wherein detecting the position of the screen unit comprises calculating a number of revolutions of the gear of the drive motor based on an interval between positions of the screen unit in a movement path, and wherein stopping the drive motor comprises stopping the drive motor when the number of revolutions of the gear of the drive motor reaches a preset number of revolutions.

9. The method of claim 8, wherein stopping the drive motor comprises:

comparing the number of revolutions of the gear of the drive motor with a reference value; and detecting whether the drive motor is abnormal based on a result of comparing the number of revolutions of the gear of the drive motor with the reference value.

10. The method of claim 5, wherein the preset position comprises a start point or an end point in the open mode or closed mode.

11. The method of claim 5, wherein stopping the drive motor comprises stopping the drive motor after detecting a target position of the screen unit using at least one of the open or closed switch or a number of revolutions of a gear of the drive motor.

* * * * *